(12) United States Patent
Mosko

(10) Patent No.: US 10,862,962 B2
(45) Date of Patent: Dec. 8, 2020

(54) DYNAMIC CONTENT DISTRIBUTION IN AN ENTERPRISE NETWORK

(71) Applicant: Palo Alto Research Center Incorporated, Palo Alto, CA (US)

(72) Inventor: Marc E. Mosko, Santa Cruz, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 16/156,565

(22) Filed: Oct. 10, 2018

(65) Prior Publication Data

US 2020/0120156 A1 Apr. 16, 2020

(51) Int. Cl.
*G06F 15/173* (2006.01)
*H04L 29/08* (2006.01)
*H04L 12/24* (2006.01)

(52) U.S. Cl.
CPC .......... *H04L 67/1051* (2013.01); *H04L 41/12* (2013.01)

(58) Field of Classification Search
None
See application file for complete search history.

(56) References Cited

U.S. PATENT DOCUMENTS

| | | | | |
|---|---|---|---|---|
| 6,983,317 B1* | 1/2006 | Bishop | .................. | H04L 41/065 709/223 |
| 7,013,389 B1* | 3/2006 | Srivastava | ............ | H04L 9/0822 713/163 |
| 9,300,729 B1* | 3/2016 | Stoica | .................... | H04L 67/104 |
| 2005/0152286 A1* | 7/2005 | Betts | ........................ | H04L 45/02 370/255 |
| 2005/0216559 A1* | 9/2005 | Manion | ................. | H04L 67/104 709/205 |
| 2008/0072035 A1* | 3/2008 | Johnson | .............. | H04L 63/0428 713/153 |
| 2008/0154919 A1* | 6/2008 | Barlen | .................. | G06F 21/552 |
| 2008/0177861 A1* | 7/2008 | Basani | .................. | H04L 69/329 709/218 |
| 2012/0159176 A1* | 6/2012 | Ravindran | ............ | H04L 63/104 713/176 |
| 2016/0149980 A1* | 5/2016 | Karthikeyan | ........... | H04L 65/80 709/219 |
| 2019/0349261 A1* | 11/2019 | Smith | ................. | H04L 67/1046 |

* cited by examiner

*Primary Examiner* — Phyllis A Book
(74) *Attorney, Agent, or Firm* — Shun Yao; Park, Vaughan, Fleming & Dowler LLP

(57) ABSTRACT

Embodiments described herein provide a system for facilitating dynamic content distribution in an enterprise environment. During operation, the system determines topographical information of the enterprise environment. The system determines a set of logical groups based on the topographical information. A respective logical group can include one or more devices managed by the controller and a network that provides connections among the one or more devices. The system generates a distribution plan for a piece of content via a first distribution tree. A respective node of the first distribution tree corresponds to a logical group of the set of logical groups. The logical group hosting the piece of content can correspond to a root node of the first distribution tree. The system then sends a notification message comprising the distribution plan to a respective logical group of the set of logical groups.

20 Claims, 16 Drawing Sheets

DYNAMIC CONTENT DISTRIBUTION IN AN ENTERPRISE NETWORK

BACKGROUND

Field

This disclosure is generally related to the field of content distribution. More specifically, this disclosure is related to a system and method for efficiently distributing content in an enterprise network.

Related Art

The proliferation of the Internet and e-commerce continues to create a vast amount of digital content. An enterprise or large corporation may include a network of managed devices, such as cloud storage devices and printers, distributed across multiple sites. In such a network of devices, a device manager may manage (e.g., configure and control) the devices in a local network of one of the sites. This device manager can be responsible for firmware updates, policy file distribution, or data transfers. These operations typically involve large file transfers to a large number of managed devices within the enterprise network.

A conventional device manager typically manages devices based on, e.g., a Simple Network Management Protocol (SNMP) query, which is based on the Internet Protocol (IP) addresses of the managed devices. However, each device can be assigned an IP address by a Dynamic Host Configuration Protocol (DHCP) server based on a local address pool (e.g., from a set of private IP addresses). To facilitate access to the devices in a private network, the device manager conventionally resides within the same network, such as the same private IP sub-network and the local area network (LAN). However, with large enterprises, the device manager may need to distribute large files across multiple subnets.

The device manager typically uses the existing networking framework and protocols to enable large-scale file distribution within the enterprise network. However, such solutions are directed toward topology-aware peer-to-peer content distribution solutions. These solutions estimate the network conditions between the participants to find suitable candidates for a specific file. These solutions, however, usually do not plan the distribution of a file. As a result, the file may be distributed in the network based on demand. In particular, since these solutions are for the Internet, they are designed for widely distributed participants with minimum topological correlation. Sometimes a particular file might have a flash popularity and create a temporal interest correlation, but the topological correlation remains disperse. Therefore, these solutions may not serve an enterprise environment, which can have a high degree of topological and temporal correlation for planned use, such as firmware updates or operating system patches.

SUMMARY

Embodiments described herein provide a system for facilitating dynamic content distribution in an enterprise environment. During operation, the system determines topographical information of the enterprise environment. The system determines a set of logical groups based on the topographical information. A respective logical group can include one or more devices managed by the controller and a network that provides connections among the one or more devices. The system generates a distribution plan for a piece of content via a first distribution tree in the network. A respective node of the first distribution tree corresponds to a logical group of the set of logical groups. The logical group hosting the piece of content can correspond to a root node of the first distribution tree. The system then sends a notification message comprising the distribution plan to a respective logical group of the set of logical groups.

In a variation on this embodiment, the distribution plan further comprises a timeline indicating when a receiving device can request the piece of content.

In a variation on this embodiment, the piece of content is a firmware update for the one or more devices managed by the controller.

In a variation on this embodiment, the system selects one or more group heads for a respective logical group of the set of logical groups. The inter-group connections between a first and a second logical group are formed between the respective group heads of the first and second logical groups.

In a further variation, the first logical group includes a first group head and a second group head. The piece of content is divided into a set of unique blocks. The first group head can obtain a first subset of the set of unique blocks from an upstream node of the first distribution tree and a second subset of the set of unique blocks from the second group head.

In a further variation, the system determines a second distribution tree within the first logical group. The second distribution tree can span a respective receiving node of the piece of content. The first and second group heads can be at a top level of the second distribution tree.

In a variation on this embodiment, the system can use message queue (MQ)-based message exchanges to determine the topographical information by determining one or more of: device information of one or more devices of the enterprise environment and bandwidth of a respective link in the enterprise environment.

Embodiments described herein provide a system for facilitating dynamic content distribution in an enterprise environment. During operation, the system stores a piece of content in the storage device of a source device of the enterprise environment. Subsequently, the system receives a request for the piece of content from a first receiving device. The system then determines the workload of the source device based on a scoreboard that indicates the current and allocated tasks of the source device. Based on the workload of the source device, the system selects, for the first receiving device, a response option from a set of options, which includes an immediate acceptance, a deferred acceptance, a delegation, and a rejection.

In a variation on this embodiment, if the system selects the deferred acceptance as the response option, the system issues a first token, which is authenticated by a key of the source device and issued with a time window for the first receiving device. Upon receiving the first token, the system allocates a channel identifier identifying a channel via which the first receiving device can obtain the piece of content from the source device.

In a variation on this embodiment, if the system selects the delegation as the response option, the system determines that a second receiving device has obtained the piece of content and issues a second token, which is authenticated by a key of the second receiving node issued with a time window for the first receiving node. The system can allocate a channel identifier identifying a channel via which the first receiving device can obtain the piece of content from the second receiving device.

BRIEF DESCRIPTION OF THE FIGURES

In the figures, like reference numerals refer to the same figure elements.

DETAILED DESCRIPTION

Figure 1A:
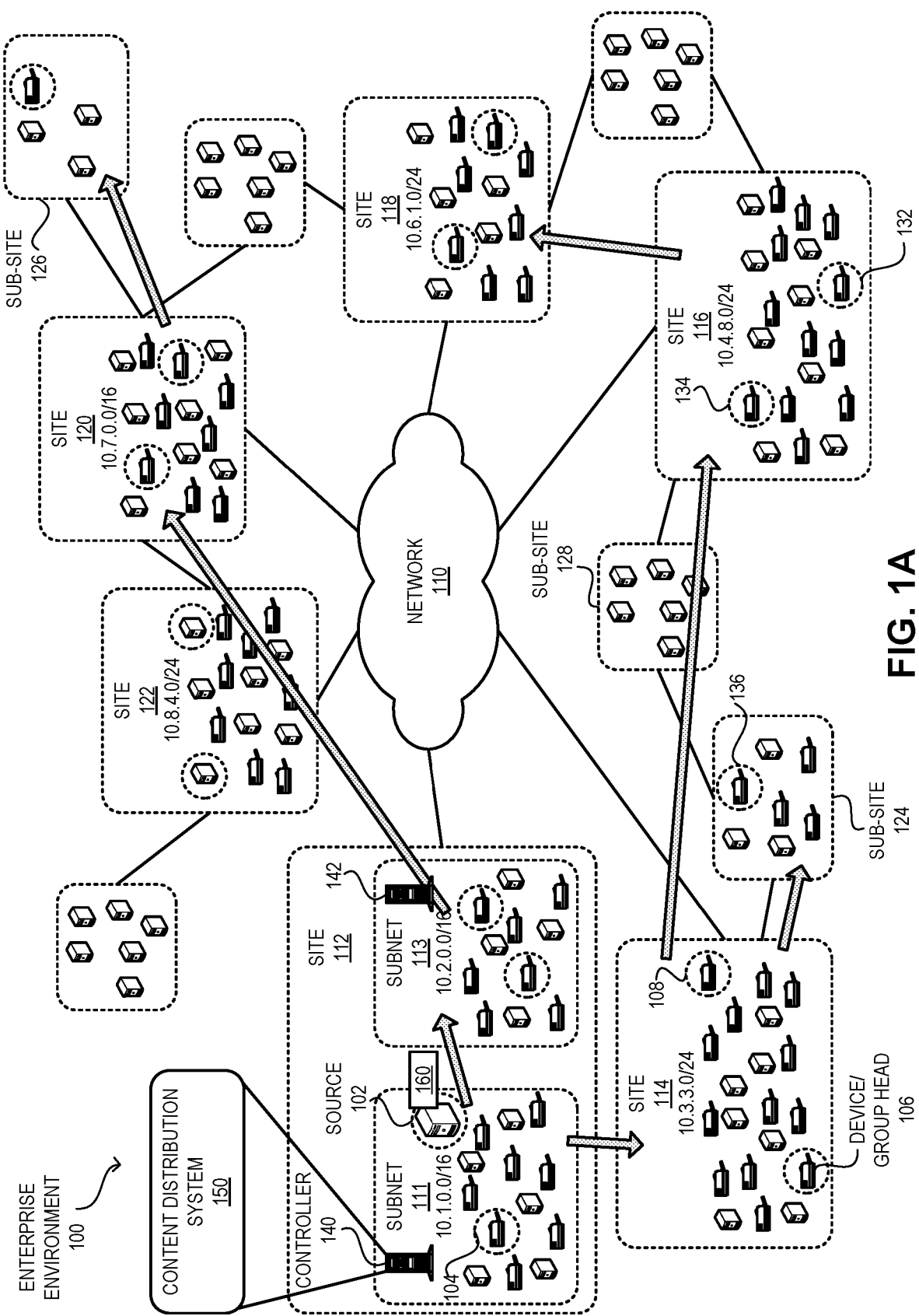
FIG. 1A illustrates an exemplary enterprise environment supporting an efficient content distribution, in accordance with an embodiment of the present application.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein solve the problem of efficiently distributing large pieces of content in an enterprise environment by (i) planning the distribution of a large piece of content based on the topographical information of the enterprise environment; and (ii) facilitating deferrable and delegable content distribution in the enterprise environment.

With existing technologies, a source device (e.g., a device manager) distributes large pieces of content via point-to-point communication to a receiving device (e.g., a managed device). If a piece of content, such as a firmware update, is sent to a large number of receiving devices, this process is repeated for each receiving device. Such a mode of distribution can cause a large amount of traffic in the networking infrastructure of the enterprise environment. In addition, since each transfer can be an individual transfer between a device pair, each transfer can be vulnerable to failure. As a result, the enterprise environment can face a non-trivial failure rate.

Embodiments described herein solve these problems by providing a content distribution system that can discover the topography of the enterprise environment, plan a distribution overlay for a piece of content, and use peer-to-peer technology to execute the transfer via the overlay. The system can facilitate a security framework, a control framework, and a data transfer framework. The security framework can provide security to both the control channel and the data channel. A distinguished node can be responsible for controlling the system and is thus called the controller. The role of the controller can be distributed over multiple devices (e.g., to have redundancy). The controller can authenticate messages (e.g., using a public key system (RSA) and/or a symmetric key exchange).

The control framework can use a set of messages, which can be commands, requests, responses, and notifications. The commands can be issued from the controller, requests and notifications can be issued from devices, and responses follow commands or requests. Each message can be signed by the sender and transported over the control channel. In some embodiments, the control channel can be implemented based on a message queue or Transmission Control Protocol (TCP) connections. They can use the control channel for monitoring, organizing, and controlling other devices. For example, the controller can instruct devices to take measurements, such as device configurations and network conditions, and provide the measurements to the controller. The controller can determine the topographical information of the enterprise environment based on the measurements. The controller can then plan efficient distribution paths for a specific piece of content from a source device (e.g., a storage server).

The data transfer framework can provide a file transfer protocol in the enterprise environment. The controller can notify each managed device in the enterprise environment regarding which piece of content to request. The controller can also notify a respective managed device of a timeframe for the piece of content (e.g., when to request and where to request from). Managed devices can be configured with a priority value that indicates a priority for the request. For example, the priority can indicate which source device the managed device should request a piece of content from first. In some embodiments, the controller organizes a set of managed devices into a logical group (e.g., based on Internet Protocol (IP) subnets). To distribute a piece of content, the controller can generate a distribution tree that includes a logical group as a node of the tree. Each group can include one or more group heads responsible for obtaining the piece of content from an upstream node (i.e., the parent node of the tree). The root of the tree can be the subnet that includes the source of the piece of content.

The group heads can deploy a block-based protocol that allows multiple group heads to simultaneously download unique blocks of the piece of content. For example, the group heads can begin downloading random blocks and coordinate with each other to avoid duplication. Alternatively, one group head can download the odd-numbered blocks, while the other can download the even-numbered blocks. Each block can include one or more data chunks (e.g., a unit of data based on which the piece of content can be divided). The group heads can also incorporate pipelining. When an upstream node downloads a threshold amount of data, a downstream node can start retrieving that data even if the entire piece of content has not been downloaded by the upstream node. Suppose that a 100 megabyte (MB) file is transferred over 1 megabytes per second (Mbps) links for 4 hops in the distribution tree. For a hop-by-hop transfer, the last node begins receiving the file after 300 seconds and finishes receiving it after 400 seconds. With a block-based protocol, the last hop begins data receiving data after 3 seconds and receives the entire file after 103 seconds.

In some embodiments, to further improve the distribution technique, the system can include a deferrable and delegable content distribution technique in the enterprise environment. The number of sources for a piece of content can be limited. That piece of content can be requested by a large number of managed devices, which operate as receiving nodes. To efficiently distribute the piece of content, the source node can defer the delivery by indicating a timeline when the source can deliver the content to a receiving node. The receiving node can request the piece of content at the time indicated by the deferral. Furthermore, once the piece of content has been delivered to a receiving node, that node can start operating as a source node. The original source node can delegate a request for that piece of content to that new source node. This allows a receiving device to choose a source node that can deliver the piece of content efficiently (e.g., can deliver the earliest).

Exemplary System

FIG. 1A illustrates an exemplary enterprise environment supporting an efficient content distribution, in accordance with an embodiment of the present application. An enterprise environment 100 can be distributed across a number of sites 112, 114, 116, 118, 120, and 122. These sites can be coupled to each other via a network 110, such as a local or a wide area network. The wide area network can be the Internet. The sites can also have direct connection with each other (e.g., with point-to-point optical fiber). A site, such as site 112, can include multiple subnets 111 (e.g., 10.1.0.0/16) and 113 (e.g., 10.2.0.0/16). On the other hand, some other sites, such as site 114 can have one subnet (e.g., 10.3.3.0/24), which may span a sub-site 124 (e.g., a nearby smaller site under the same management). Similarly, site 120 can have one subnet (e.g., 10.7.0.0/16), which may span a sub-site 126. It should be noted that sub-sites 124 and 126 can also maintain their own sub-nets.

With existing technologies, in environment 100, a source device 102 distributes large pieces of content via point-to-point communication to a receiving device. If a piece of content, such as a firmware update, is sent to a large number of receiving devices across the sites of enterprise environment 100, this process is repeated for each receiving device in each site. Such a mode of distribution can cause a large amount of traffic in network 110 of enterprise environment 100. In addition, since each transfer can be an individual transfer between a device pair, each transfer can be vulnerable to failure. As a result, enterprise environment 100 can face a non-trivial failure rate.

To solve this problem, embodiments described herein provide a content distribution system 150 that can discover the topography of enterprise environment 100, plan a distribution overlay for a piece of content, and use peer-to-peer technology to execute the transfer via the overlay. System 150 can facilitate a security framework, a control framework, and a data transfer framework. The security framework can provide security to both the control channel and the data channel. A distinguished node 140 can be responsible for controlling the system and is thus called controller 140. In some embodiments, system 150 can be hosted on controller 140. Enterprise environment 100 can include a plurality of controllers 140 and 142, which can facilitate high availability to each other. Controller 140 can authenticate messages (e.g., using a public key system and/or a symmetric key exchange).

The control framework provided by system 150 can use a set of messages, which can be commands, requests, responses, and notifications. The commands can be issued from controller 140, requests and notifications can be issued from managed devices, such as devices 106 and 108, and responses follow commands or requests. Each message can be signed by the sender and transported over the control channel. For example, if controller 140 sends a message to device 106, controller 140 can sign that message with a private key of controller 140. In some embodiments, the control channel can be implemented based on message queuing or TCP connections. The control channel can be used for monitoring, organizing, and controlling other devices. For example, controller 140 can instruct managed devices to take measurements, such as device configurations and network conditions, and provide the measurements to controller 140. Controller 140 can determine the topographical information of enterprise environment 100 based on the measurements. Controller 140 can then plan efficient distribution paths for a specific piece of content 160 from a source device 102. Controller 140 and source device 102 can be the same device or different devices.

The data transfer framework can provide a file transfer protocol in enterprise environment 100. Controller 140 can notify each managed device in enterprise environment 100 regarding which piece of content to request. Controller 140 can also notify a respective managed device of a timeframe for content 160 (e.g., when to request and where to request from). Managed devices can be configured with a priority value that indicates a priority for the request. For example, the priority can indicate which source device the managed device should request a piece of content from first. In some embodiments, controller 160 organizes a set of managed devices into a logical group based on one or more grouping criteria. Examples of a grouping criterion include, but are not limited to, an IP subnet, a local area network, and a spanning tree in a layer-2 network.

To distribute content 160, controller 140 can generate a distribution tree that includes a logical group as a node of the tree. In this example, a respective site or sub-site is represented as a logical group and a highlighted arrow depicts each branch of the tree. Since site 112 has two subnets 111 and 113, they can be two different nodes on the tree. If a site or sub-site, such as sub-site 128, of enterprise environment 100 does not include a recipient for content 160, that sub-site is not included in the tree. Each group can include one or more group heads (denoted with dashed circles) responsible for obtaining the piece of content from an upstream node (i.e., the parent node of the tree). The group corresponding to subnet 111 can include source device 102 and managed device 104 as group heads. Similarly, the logical group corresponding to site 114 can include devices 106 and 108 as group heads, and the logical group corresponding to site 116 can include devices 132 and 134 as group heads. Hence, devices 102, 104, 106, 108, 132, and 134 can be referred to as group heads as well. The root of the tree in this example is subnet 111, which includes source device 102 hosting content 160. It should be noted that controller 140 can plan a distribution tree for each piece of content, which can vary (e.g., based on source device and receiving devices).

In some embodiments, controller 140 can calculate a Steiner tree (e.g., a minimum-cost tree) to generate the inter-group distribution tree. In enterprise environment 100, some devices can be receiving devices (e.g., a recipient of content 160) and the other devices can operate as relay devices or dormant devices. The Steiner tree can span all receiving devices, if needed, using some relay devices, to find the minimum-cost tree. Controller 140 can calculate a minimum-cost tree using a combination of shortest paths. Controller 140 can determine the shortest paths from each receiving device to the source device in enterprise environment 100 using the topography information of enterprise environment 100. Controller 140 then determines the minimum cost single source directed spanning tree from all receiving devices to source device 102.

Controller 140 can determine the topography information of enterprise environment 100 based on one or more of: a user input and network discovery using measurements. Controller 140 can perform the network discovery by measuring the bandwidth and round-trip time between two subnets. To do so, source node 102 sends a series of packets of different lengths a number of times to each group head. Controller 140 determines the minimum response time for each packet size and calculates the linear regression on those values. Controller 140 also determines the bandwidth in bits per second and the round-trip time is in seconds. Controller 140 can aggregate multiple measurements via an exponential moving average to determine the bandwidth of a link.

Group heads are responsible for inter-group data transfer. Group heads 106 and 108 can be logically coupled to upstream group heads 102 and 104. Similarly, group heads 132 and 134 can be logically coupled to upstream group heads 106 and 108. If a logical group does not have a sufficient number of receiving devices for content, that logical group may not have multiple group heads. For example, the logical group corresponding to sub-site 124 can include one group head 136. For efficient distribution, controller 140 can divide content 160 into a number of blocks (e.g., each with a predefined number of data chunks of fixed size). Since group head 104 is in the same logical group of source 102, group head 104 first obtains content 160 from source 102.

In some embodiments, group heads 106 and 108 can deploy a block-based protocol that allows both group heads to simultaneously download unique and non-overlapping blocks of content 160. Group heads 106 and 108 can begin downloading random blocks and coordinate with each other to avoid duplication. If one group head, such as group head 108, fails during the transfer, group head 106 can continue downloading the remaining blocks. Alternatively, group head 106 can download the odd-numbered blocks of content 160 from upstream group heads 102 and 104. To facilitate load-balancing, group head 106 can download a subset of the odd-numbered blocks of content 160 from group head 102, while downloading the rest from group head 104. In the same way, group head 108 can download the even-numbered blocks from upstream group heads 102 and 104. Group heads 106 and 108 can exchange the unique blocks over their peer link to obtain each block and reconstruct a full copy of content 160. Group head 106 can also download the odd-numbered blocks of content 160 from upstream group head 102, and group head 108 can then download the even-numbered blocks of content 160 from upstream group head 104. Group heads can also incorporate pipelining. When group heads 106 and 108 have downloaded a threshold number of blocks, downstream group heads 132 and 134 can start retrieving those blocks even if content 160 has not been downloaded by upstream groups heads 106 and 108 in its entirety.

Figure 1B:
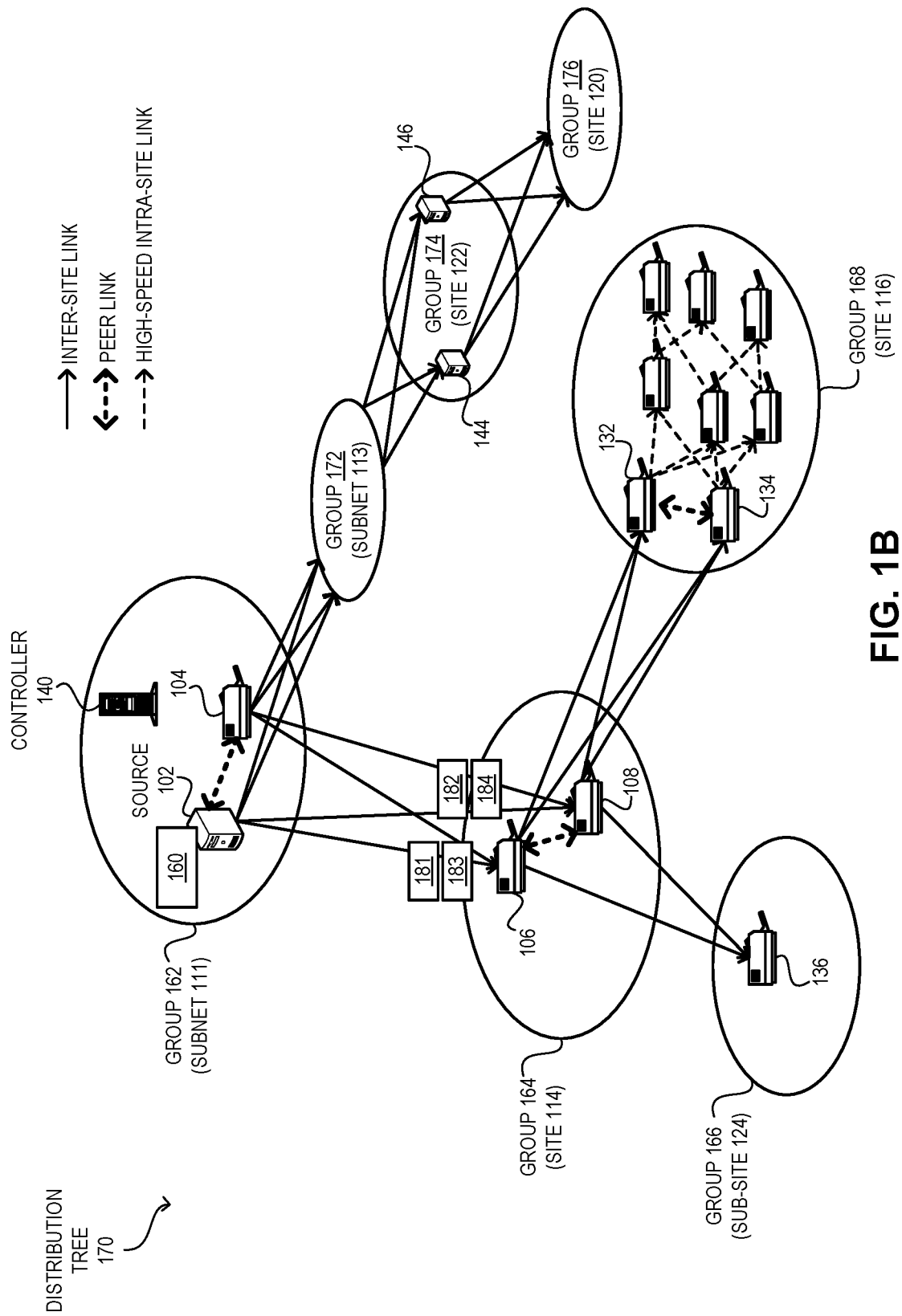
FIG. 1B illustrates exemplary inter-group and intra-group distributions of content in an enterprise environment, in accordance with an embodiment of the present application.

FIG. 1B illustrates exemplary inter-group and intra-group distributions of content in an enterprise environment, in accordance with an embodiment of the present application. In this example, Controller 140 can generate a distribution tree 170 for distributing content 160. Distribution tree 170 can include logical groups 162, 164, 166, 168, 172, 174, and 176 as nodes of tree 170. Logical groups 162, 164, 166, 168, 172, 174, and 176 can correspond to subnet 111, site 114, sub-site 124, site 116, subnet 113, site 122, and site 120, respectively. Controller 140 can determine at least two managed devices, which can be receiving devices or relaying devices, as group heads. Source 102 and device 104 can be group heads for group 162, devices 106 and 108 can be group heads for group 164, device 136 can be group heads for group 166, and devices 132 and 134 can be group heads for group 168.

The inter-group links can be formed between the group heads. For example, the links between groups 162 and 164 are between group heads 102 and 104 of group 162, and group heads 106 and 108 of group 164. Since group 166 includes one group head 136, the links between groups 164 and 166 are between group heads 106 and 108 of group 164, and group head 136 of group 166. As shown in FIG. 1A, a group can be an intermediary group, such as group 174 corresponding to site 122. A group head can be an intermediary operating as a relay or a receiving device. For example, group heads 144 and 146 of group 174 can be intermediary group heads that facilitate the establishment of data transfer from group 172 to group 176. Each group head can maintain a link with each upstream group head (e.g., each parent group head). For example, group head 136 can have a link to each of group heads 106 and 108.

Group heads within a group can have a full peer relationship with each other with a corresponding peer link, which allows them to transfer data using peer-to-peer transfer protocol to coordinate data blocks. For example, group heads 106 and 108 can maintain a full pair relationship. Group heads 106 and 108 can coordinate between themselves to avoid downloading the same block more than once on the inter-group links. If content 160 is divided into blocks 181, 182, 183, and 184, group head 106 can download blocks 181 and 183, and group head 108 can download blocks 182 and 184 from upstream group heads 102 and 104. Group head 106 then obtains blocks 182 and 184 from group head 108 via the peer link, and group head 108 can obtain blocks 181 and 183 from group head 106 via the peer link. To facilitate this, group heads 106 and 108 can be configured with a higher preference to obtain blocks from peer links. Each of group heads 106 and 108 then combines blocks 181, 182, 183, and 184 to generate content 160.

Within group 168, a number of managed devices can obtain content 160 from group heads 132 and 134. For intra-group distribution, controller 140 creates a distribution hierarchy rooted at group heads 132 and 134. The hierarchy can be represented as an n-ary tree where each managed device is coupled to p upstream parent nodes in the n-ary tree. Among the p links, one link can be the active link and the others can operate as standby links for facilitating redundancy. Each managed device can download blocks 181, 182, 183, and 184 from the active parent node. In some embodiments, the network within a logical group can be a high-speed local area network (LAN). As a result, content 160 can be efficiently distributed within logical group 168 via the LAN. Alternatively, group heads 132 and 134 can use LAN broadcast to transfer blocks 181, 182, 183, and 184 to all managed device in group 168.

In some embodiments, controller 140 can notify each managed device regarding the time and schedule of the distribution of content 160. Controller 140 can expect the peer-to-peer protocol to connect to the upstream device to subscribe to content 160, and wait until that upstream device obtains at least a threshold number of blocks. If the upstream device has downloaded the threshold number of blocks, a downstream device can start downloading those blocks from the upstream device.

Figure 2:
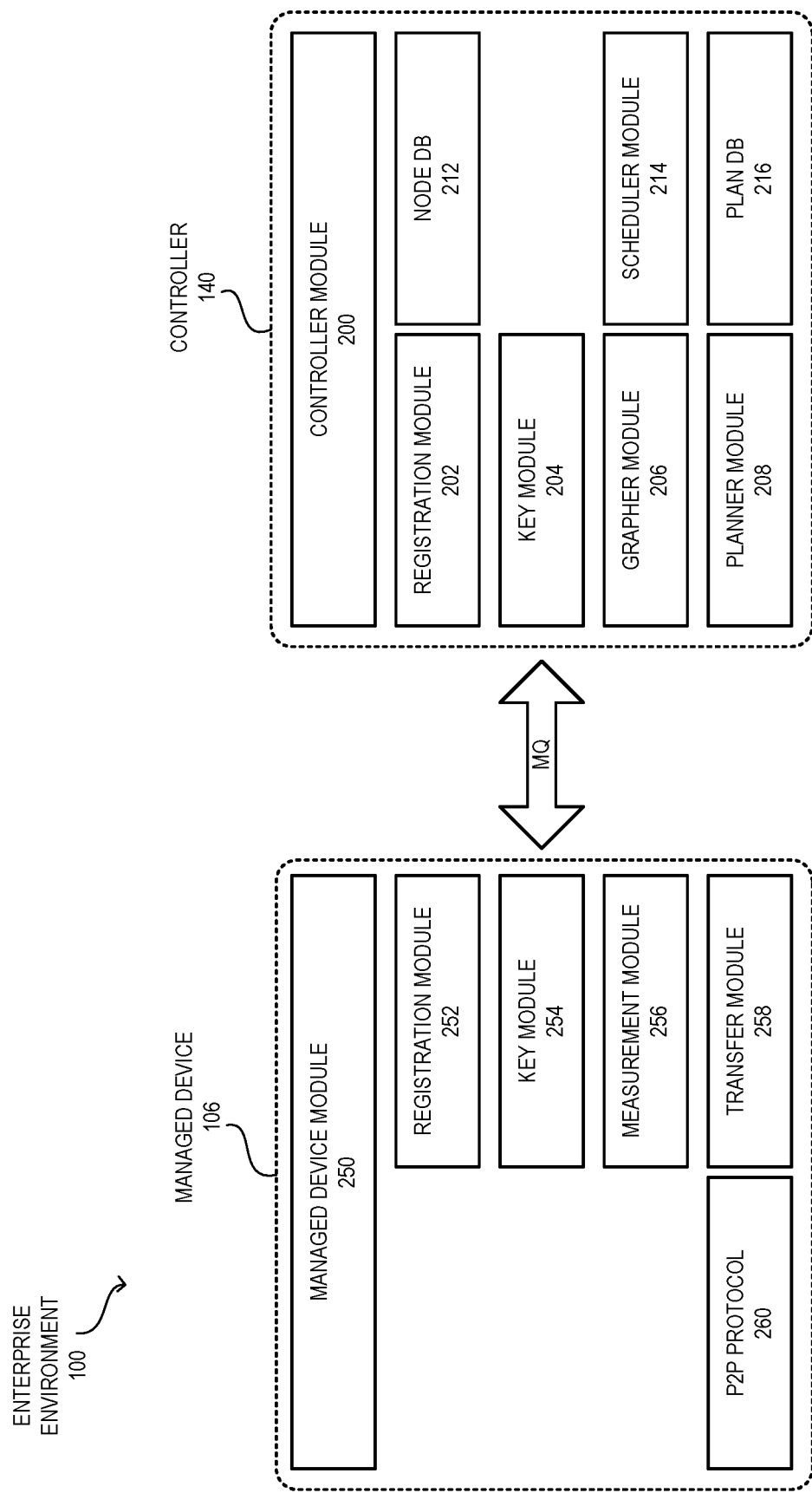
FIG. 2 illustrates an exemplary system architecture that facilitates efficient distribution of content in an enterprise environment, in accordance with an embodiment of the present application.

FIG. 2 illustrates an exemplary system architecture that facilitates efficient distribution of content in an enterprise environment, in accordance with an embodiment of the present application. In this example, controller 140 and a respective managed device, such as managed device 106, include the principle operational modules controller module 200 and managed device module 250, respectively. Controller module 200 operates based on registration module 202, key module 204, grapher module 206, scheduler module 214, and planner module 208. On the other hand, managed device module 250 can operate based on registration module 252, key module 254, measurement module 256, and transfer module 258.

In controller 140, registration module 202 can listen for registration requests and unregister request messages from managed devices. Based on the requests, registration module 202 maintains information of a current set of devices and subnets in enterprise environment 100 in a node database 212. Key module 204 can listen for key request messages from managed devices and perform key exchange, such as Ephemeral Elliptic Curve Diffie Hellman, using message queuing. Key module 204 also updates controller 140's KeyRing with symmetric keys, such as hash-based message authentication code (HMAC). Grapher module 206 can listen for the measurement response messages, and based on these messages, maintains a weighted subnet-to-subnet graph of enterprise environment 100.

Scheduler module 214 periodically schedules measurements between subnets to measure network performance and properties. Scheduler module 214 also maintains a table indicating the edges between the subnets in node database 212. Planner module 208 determines, for a piece of content, the source device and target subnets, which include receiving devices, based on the currently registered devices and schedules experiments to determine a distribution tree. Planner module 208 initiates distribution of the piece of content by generating a distribution plan and storing it in a plan database 216. Planner module 208 can receive notification from the managed devices regarding the distribution.

In managed device 106, registration module 252 sends periodic registration request messages to controller 140 and listens for responses. Key module 254 periodically generates new keys by sending a key exchange request message and listens for corresponding responses. Key module 254 can also update managed device 106's KeyRing with the HMAC keys. Measurement module 256 can listen for initialization of the network measurement. Based on that, measurement module 256 can schedule network measurement and sends the measurements to grapher module 206. Transfer module 258 listens for a message from controller 140 initializing the distribution of a piece of content and schedules peer-to-peer transfers via a peer-to-peer protocol 260. Transfer module 258 can send the responses to acknowledge the transfer initialization message and notifies controller 140 regarding significant events (e.g., starting, finishing, detection of error, etc.). Protocol 260 performs a peer-to-peer file transfer under the control of planner module 208.

Content Distribution Operations

Figure 3A:
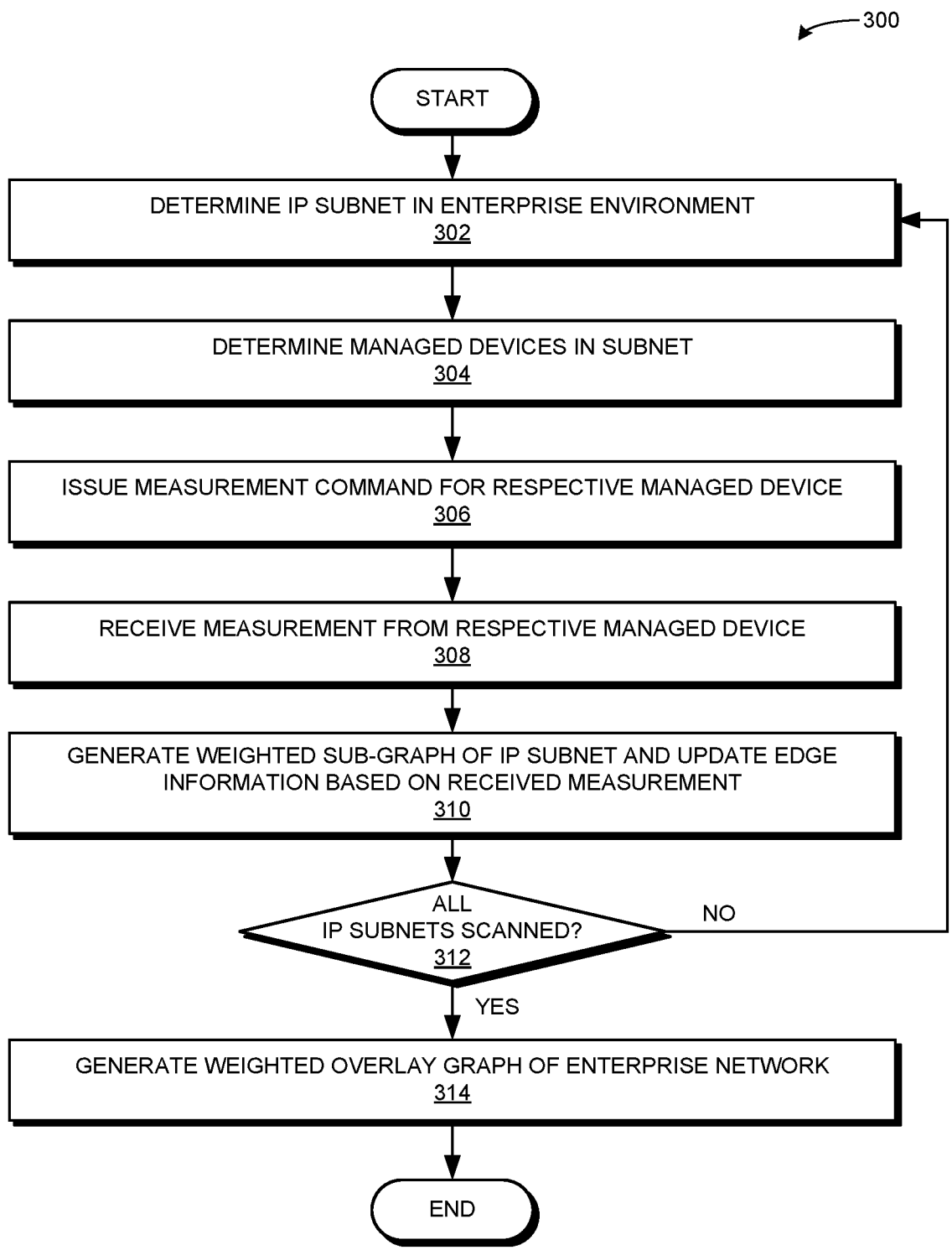
FIG. 3A presents a flowchart illustrating a method of a content distribution system determining topographical information of an enterprise environment, in accordance with an embodiment of the present application.

FIG. 3A presents a flowchart 300 illustrating a method of a content distribution system determining topographical information of an enterprise environment, in accordance with an embodiment of the present application. During operation, the system determines an IP subnet in an enterprise environment (operation 302) and determines the managed devices in the subnet (operation 304). The system then issues a measurement command for a respective managed device (operation 306) and receives measurements from a respective managed device (operation 308). The measurement command instructs the managed device to measure network and device conditions (e.g., bandwidth, latency, utilization, etc.), and report back to the system. The system generates a weighted sub-graph of the IP subnet and updates the edge information based on the received measurement (operation 310). The system checks whether all subnets have been checked (operation 312). If checked, the system generates a weighted overlay graph of the enterprise network (operation 314). Otherwise, the system continues to determine the next IP subnet in the enterprise environment (operation 302).

Figure 3B:
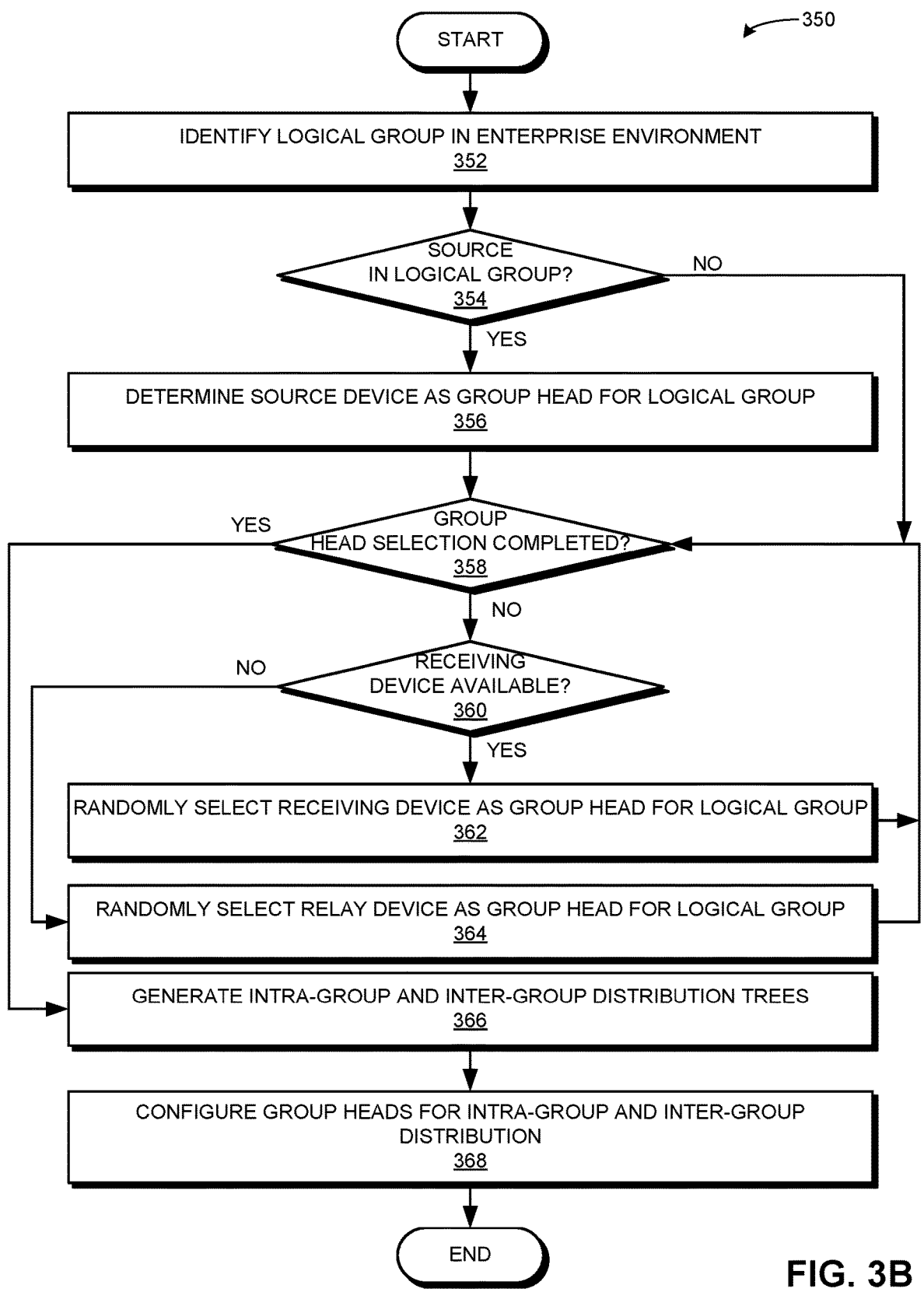
FIG. 3B presents a flowchart illustrating a method of a content distribution system planning the distribution of a piece of content based on the topographical information of an enterprise environment, in accordance with an embodiment of the present application.

FIG. 3B presents a flowchart 350 illustrating a method of a content distribution system planning the distribution of a piece of content based on the topographical information of an enterprise environment, in accordance with an embodiment of the present application. During operation, the system identifies a logical group in the enterprise environment (e.g., based on a subnet or a site) (operation 352) and determines whether the source device of the piece of content is in the logical group (operation 354). If the source device is in the logical group, the system determines the source device as a group head for the logical group (operation 356). The system then determines whether the group head selection has completed (e.g., a predetermined number, such as two, of group heads has been selected or no more devices to select) (operation 358). If group head selection is not completed, the system checks whether any receiving device for the piece of content is available in the logical group (operation 360).

If at least one receiving device is available, the system randomly selects a receiving device as a group head for the logical group (operation 362). Otherwise, the system randomly selects a relay device as a group head for the logical group (operation 364). Upon selecting the group head (operation 362 or 364), the system continues to determine whether the group head selection has completed (operation 358). If group head selection is completed, the system generates inter-group and intra-group distribution trees (operation 366) and configures the group heads for intra-group and inter-group distribution (operation 368). This configuration can include configuring block-based protocol.

Figure 4A:
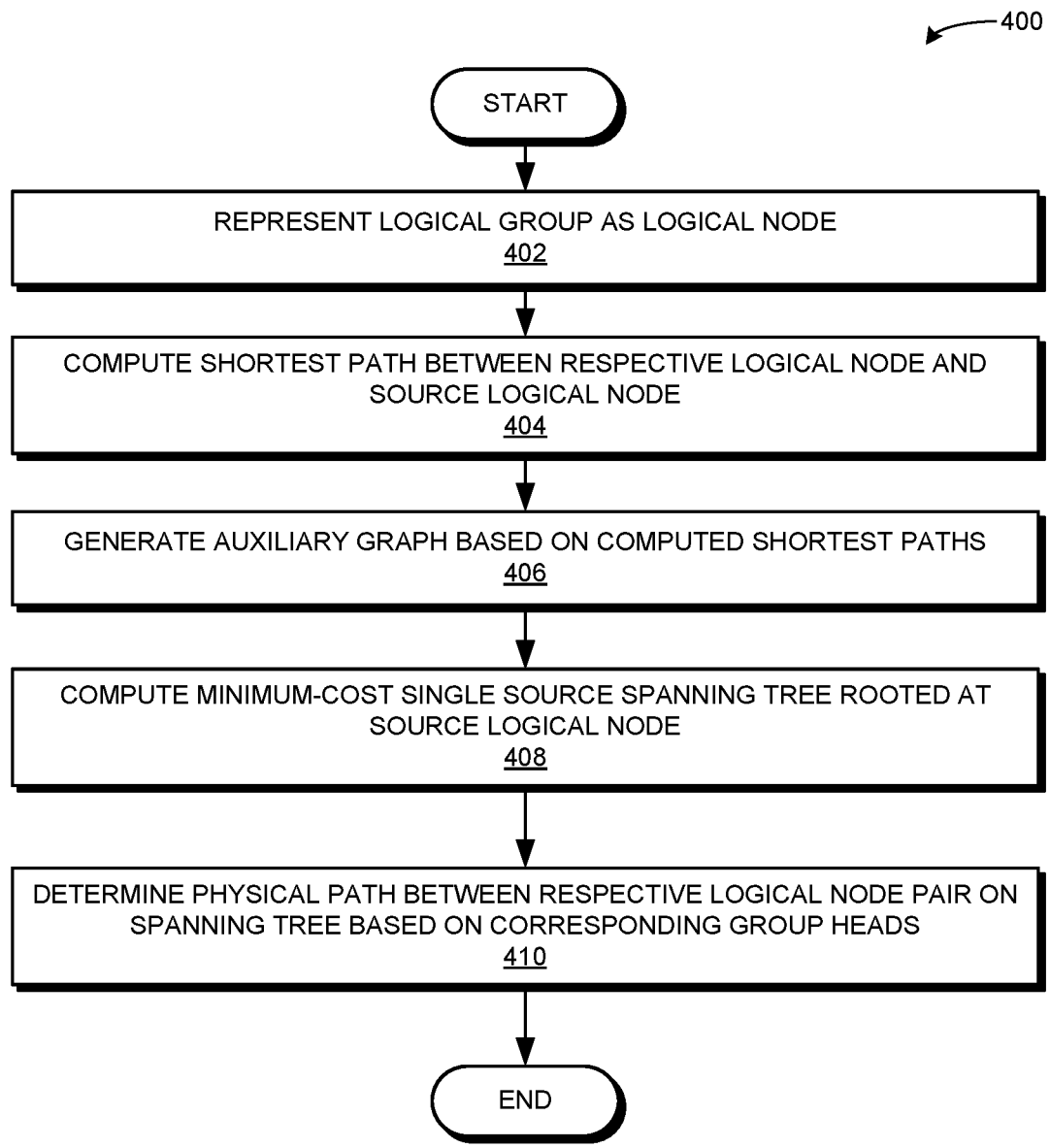
FIG. 4A presents a flowchart illustrating a method of a content distribution system determining an inter-group distribution tree in an enterprise environment, in accordance with an embodiment of the present application.

FIG. 4A presents a flowchart 400 illustrating a method of a content distribution system determining an inter-group distribution tree in an enterprise environment, in accordance with an embodiment of the present application. During operation, the system represents a logical group as a logical node (operation 402) and computes the shortest path between a respective logical node and the source logical node (i.e., the logical node associated with the source device) (operation 404). The system generates an auxiliary graph based on the computed shortest paths (operation 406) and computes a minimum-cost single source spanning tree rooted at the source logical node (operation 408). The system then determines the physical paths between a respective logical node pair on the spanning tree based on the corresponding group heads (operation 410).

Figure 4B:
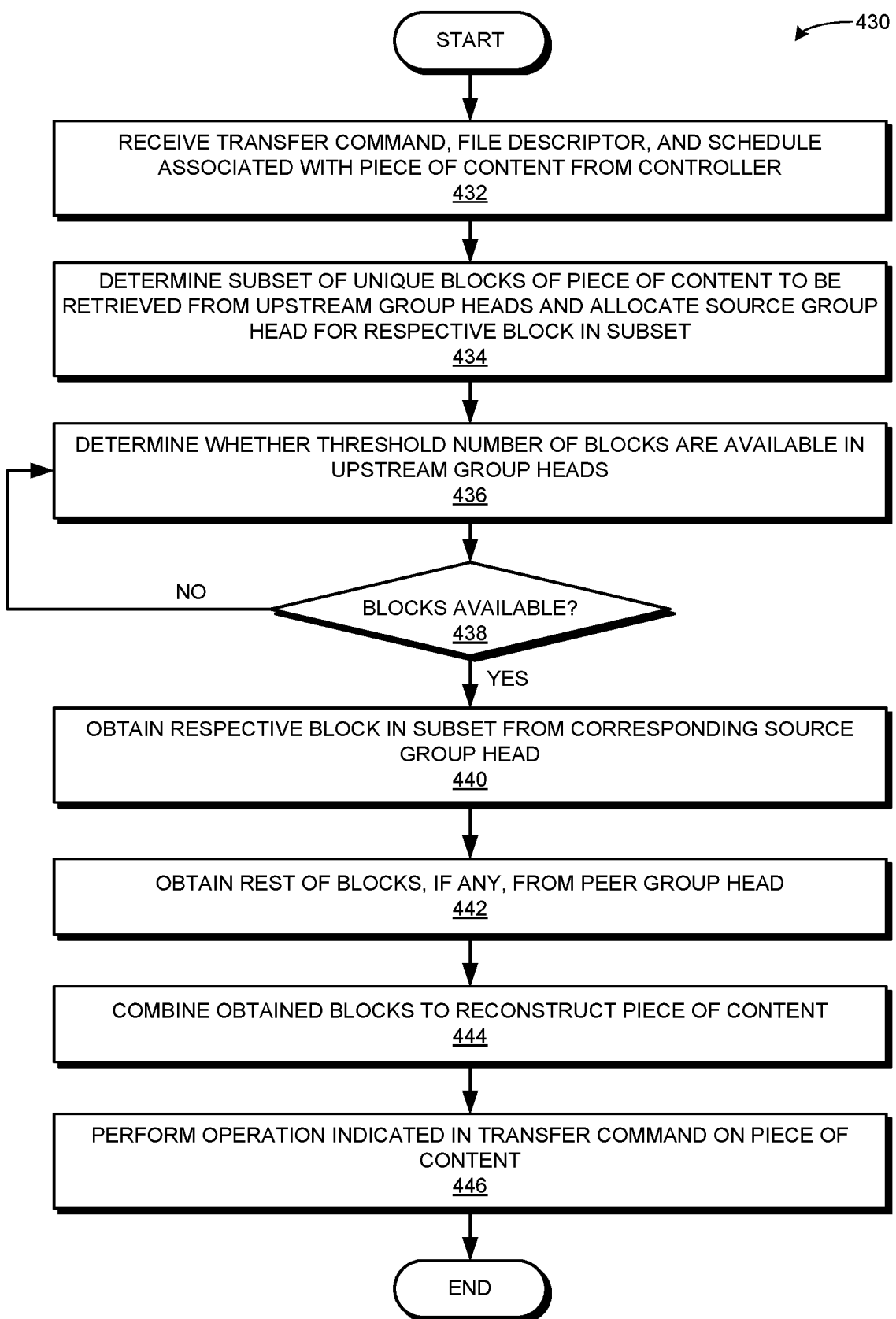
FIG. 4B presents a flowchart illustrating a method of a group head obtaining a file via an inter-group distribution tree in an enterprise environment, in accordance with an embodiment of the present application.

FIG. 4B presents a flowchart 430 illustrating a method of a group head obtaining a file via an inter-group distribution tree in an enterprise environment, in accordance with an embodiment of the present application. During operation, the group head receives a transfer command, a file descriptor, and a schedule associated with a piece of content from the controller (operation 432). Based on the received information, the group head determines a subset of unique blocks of the piece of content to be retrieved from the upstream group heads and allocates a source group head (e.g., from the upstream group heads) for a respective block in the subset (operation 434). The group head then determines whether a threshold number of blocks is available in the upstream group heads (operation 436). This allows pipelined download of the piece of content.

If a threshold number of blocks is not available (operation 438), the group head continues to determine whether a threshold number of blocks is available in the upstream group heads (operation 436). On the other hand, if a threshold number of blocks is available (operation 438), the group head obtains a respective block in the subset from the corresponding source group head (operation 440). The group head obtains the rest of the blocks, if any, from a peer group head (442). It should be noted that some logical group can have a single group head, which would retrieve each block from the upstream group heads. The group head then combines the obtained blocks to reconstruct the piece of content (operation 444) and performs the operation indicated in the transfer command (e.g., a firmware update) on the piece of content (operation 446).

Figure 4C:
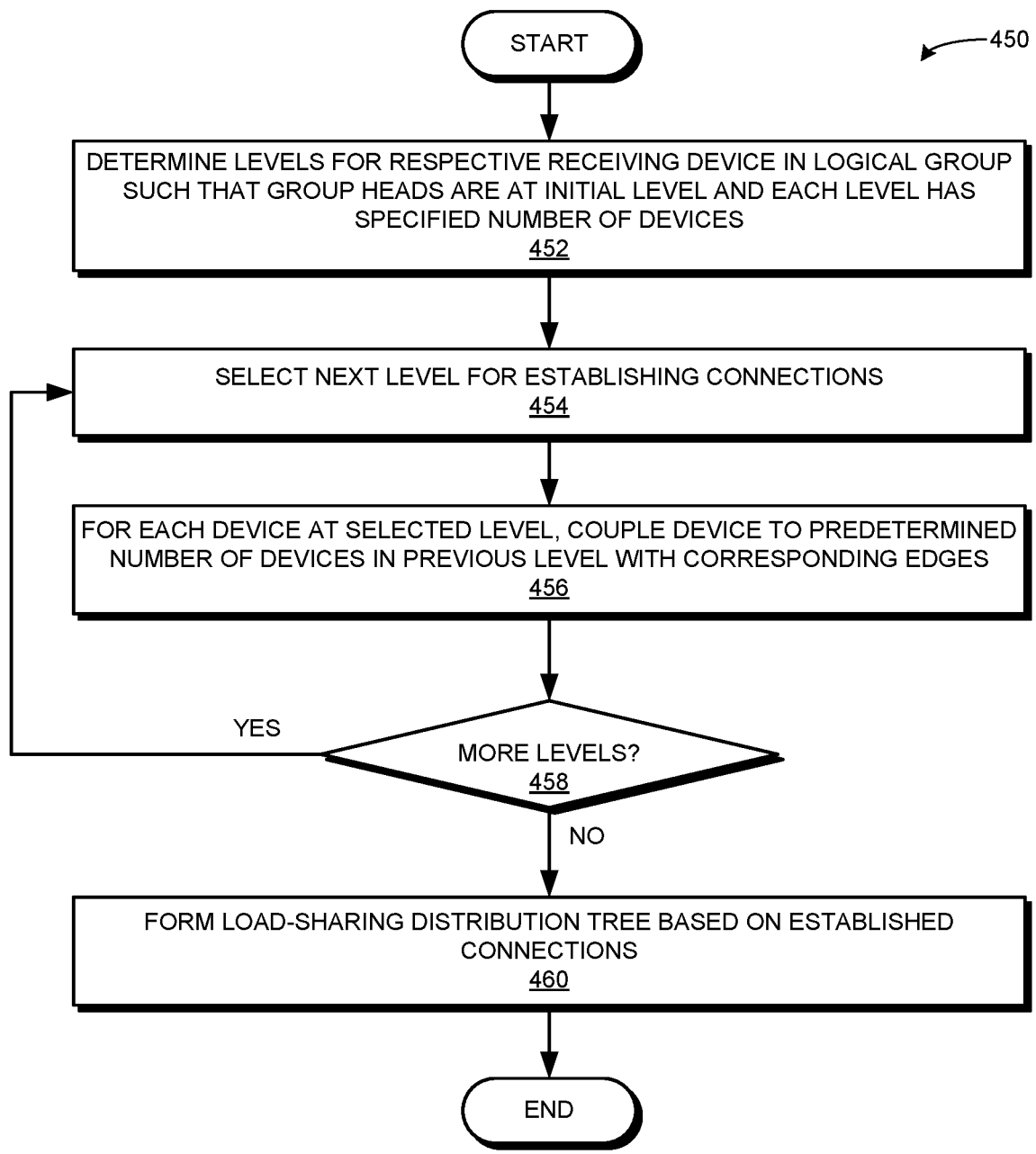
FIG. 4C presents a flowchart illustrating a method of a content distribution system determining an intra-group load-sharing distribution tree in a logical group, in accordance with an embodiment of the present application.

FIG. 4C presents a flowchart 450 illustrating a method of a content distribution system determining an intra-group load-sharing distribution tree in a logical group, in accordance with an embodiment of the present application. During operation, the system determines levels for a respective receiving device in a logical group such that group heads are at an initial level and each level has a specified number of devices (operation 452). It should be noted that all devices in a level may not be receiving devices; some devices can be relay devices. The system then selects the next level for establishing connections (operation 454). For each level at the selected level, the system couples devices to a predetermined number of devices in the previous level (e.g., the upstream devices) with corresponding edges (operation 456). If there are more levels (operation 458), the system continues to select the next level for establishing connections (operation 454). Otherwise, the system forms a load-sharing distribution tree (e.g., an n-ary tree) based on the established connections (operation 460).

Figure 4D:
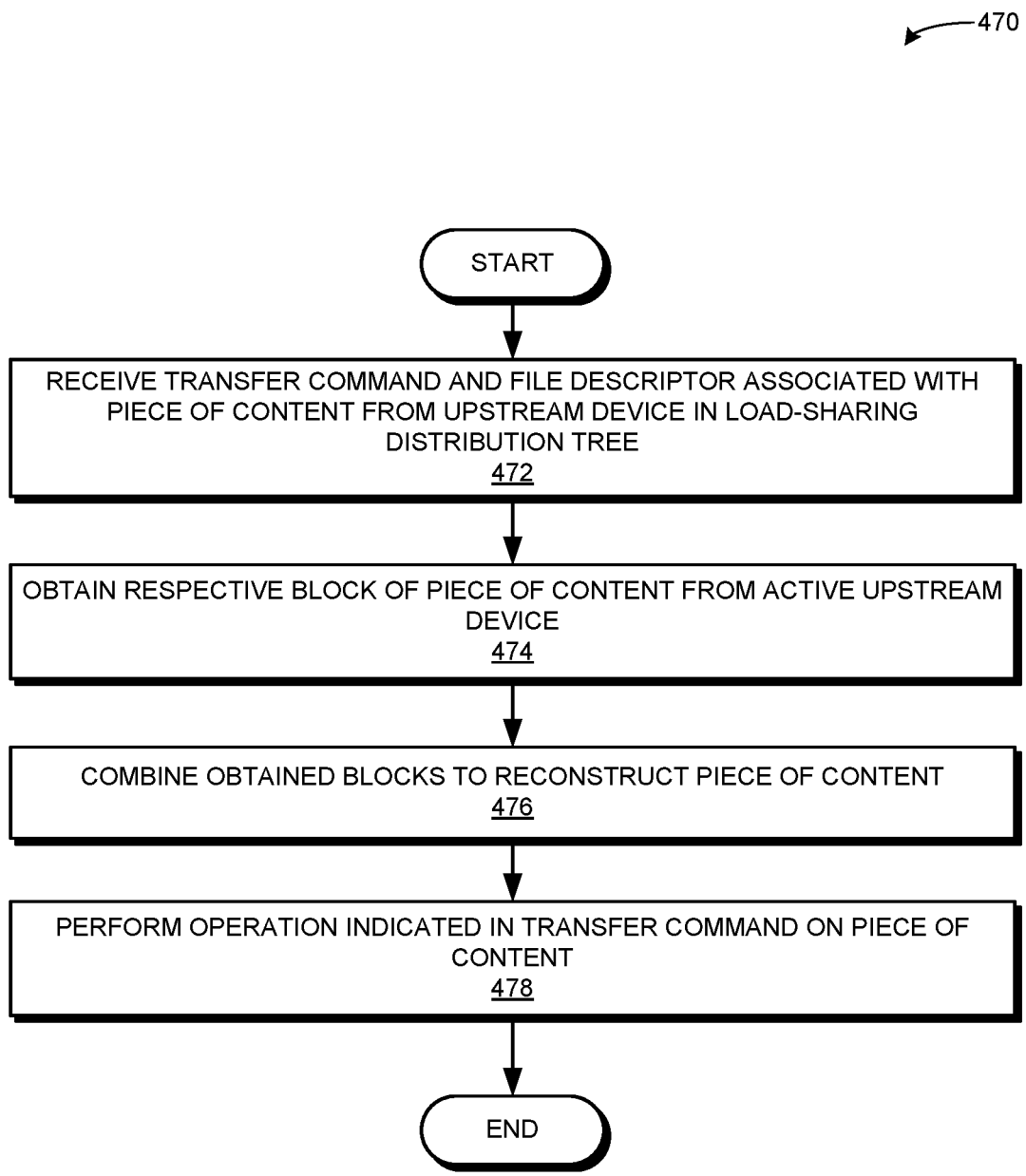
FIG. 4D presents a flowchart illustrating a method of a receiving device obtaining a file via an intra-group load-sharing distribution tree in a logical group, in accordance with an embodiment of the present application.

FIG. 4D presents a flowchart 470 illustrating a method of a receiving device obtaining a file via an intra-group load-sharing distribution tree in a logical group, in accordance with an embodiment of the present application. During operation, the receiving device receives a transfer command and a file descriptor associated with a piece of content from an upstream device in a load-sharing distribution tree (operation 472). The receiving device obtains a respective block of the piece of content from an active upstream device (operation 474) and combines the obtained blocks to reconstruct the piece of content (operation 476). The receiving device then performs the operation indicated in the transfer command (e.g., a firmware update) on the piece of content (operation 478).

Deferral and Delegation of Content Distribution

In the example in FIG. 1A, a large number of receiving devices obtain a piece of content from a limited number of sources. To improve the efficiency of the distribution of the piece of content (e.g., firmware or a media file), a source device can delegate a request for the piece of content to a receiving device that has already received the piece of content. A source device, such as source device 102 of content 160 can delegate the request locally (e.g., without intervention from controller 140). Source device 102 can also defer the request for a later time. The receiving device can resend a request at the deferred time. In this way, network environment 100 can facilitate a decentralized system that can defer and delegate the requests.

Figure 5A:
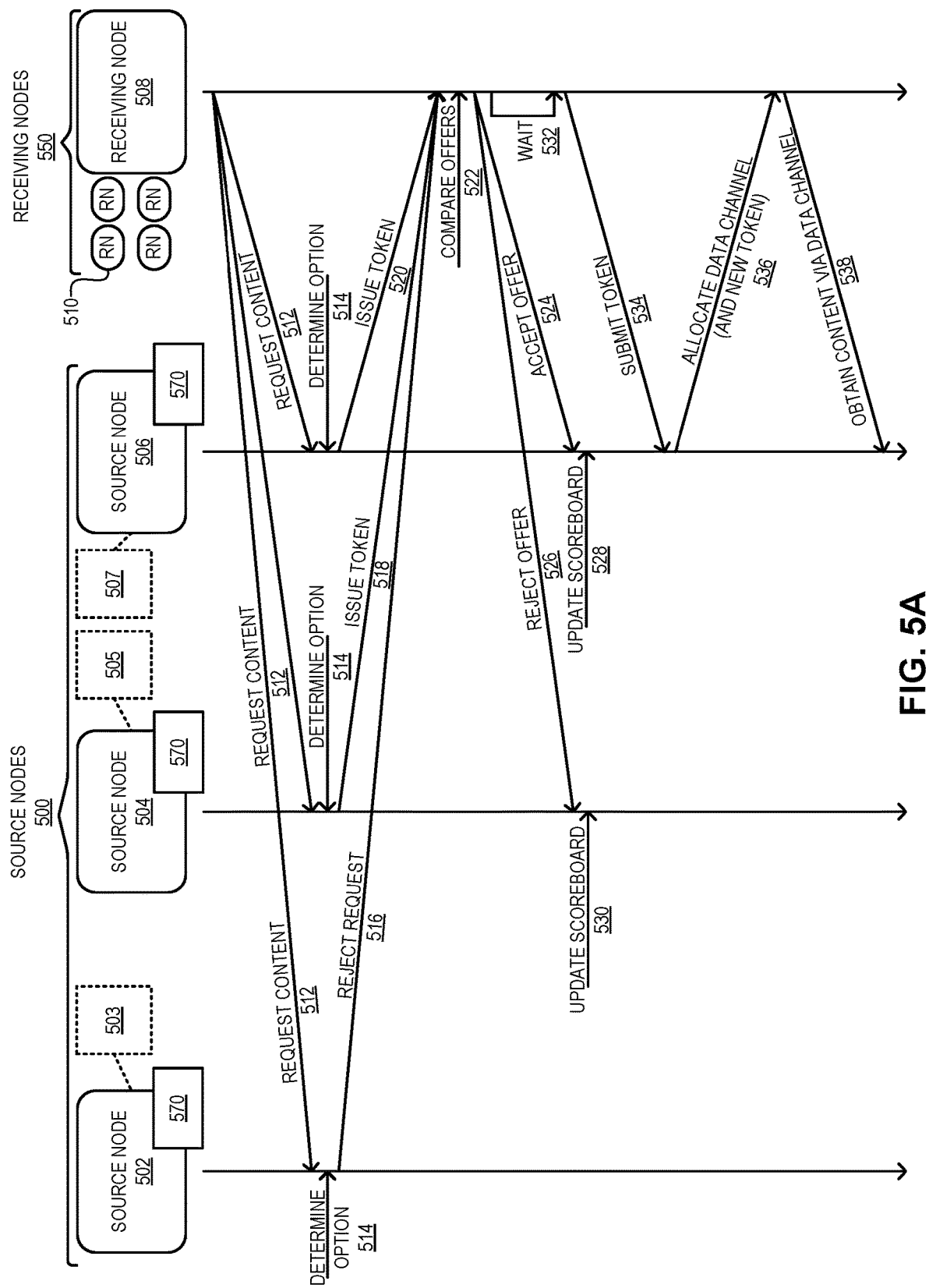
FIG. 5A illustrates an exemplary deferrable content distribution in an enterprise environment, in accordance with an embodiment of the present application.

FIG. 5A illustrates an exemplary deferrable content distribution in enterprise environment, in accordance with an embodiment of the present application. A number of receiving nodes 550, including receiving nodes 508 and 510, can discover that a piece of content 570 is hosted in a number of source nodes 500, including source nodes 502, 504, and 506. Receiving nodes 550 can discover content 570 by one or more of: an advertisement from source nodes 500 indicating the presence of content 570 and an external input (e.g., from a user). Each source node of source nodes 500 can have respective resource limits and, hence, can serve a limited number of receiving nodes.

During operation, receiving node 508 can request content 570 from source nodes 502, 504, and 506 (operation 512). Upon receiving the request, a source node can (a) serve the request immediately, (b) accept the request for a later service, (c) delegate the job to another node, or (d) reject the request. A respective source node determines, based on a scoreboard of current and reserved timeslots, one of the response options to ensure that, statistically, the source node is not oversubscribed. For example, source nodes 502, 504, and 506 can maintain scoreboards 503, 505, and 507, respectively, and determine a response option (operation 514). For example source node 502 can reject the request and notify receiving node 508 (operation 516). Source node 502 can include an indication whether it can service the request at a later time.

If a source node chooses from options (a), (b), and (c), that source node can indicate a "pending" status on the scoreboard associated with the request and awaits a response from receiving node 508. For example, source node 504 can issue a token that grants receiving node 508 access to content 570 for a specific time window and marks a pending status in scoreboard 505 (operation 518). Similarly, source node 506 can issue a token that grants receiving node 508 access to content 570 for a specific time window and marks a pending status in scoreboard 507 (operation 520). The token can be a cryptographic data structure authenticated by the issuing source node. A token is issued with an offer (e.g., the time window) for a specific receiving node by a specific source node. For example, the token issued by source node 504 can identify receiving node 508 based on an IP address of receiving node 508 and issuing source node 504 based on a key of source node 504 that authenticates the token.

Receiving node 508 compares the tokens from source nodes 504 and 506 to determine the efficient option for source node 508 (operation 522). Examples of an efficient option include, but are not limited to, minimum delay and least cost. Receiving node 508 can either accept an offer or reject it. Suppose that receiving node 508 accepts the offer from source node 506 (operation 524). Source node 506 can then update scoreboard 507 by changing the pending indicator to a permanent indicator against the offered time window (operation 528). On the other hand, receiving node 508 rejects the offer from source node 504 (operation 526). Source node 504 can then update scoreboard 505 by removing the pending indicator (operation 530).

It should be noted that an offer can have a time limit and receiving node 508 needs to confirm the offer within that time limit. Source node 504 can use the confirmation to manage scoreboard 507. Receiving node 508 can defer accepting an offer up to the time limit. Receiving node 508 can also accept an offer and later cancel the offer if receiving node 508 receives a better offer. Upon waiting for a period of time indicated by the time window of the token (operation 532), receiving node 508 can be ready to use the token. Receiving node 508 then submits the token to source node 506 (operation 534). If source node 506 is ready to serve the request, source node 506 can allocate a data channel for receiving node 508 (operation 536).

To allocate the data channel, source node 506 can issue a data channel identifier to receiving node 508. The data channel identifier represents how to access content 570 with the token. Examples of the data channel identifier can include, but are not limited to, a Uniform Resource Identifier (URI), an IP address and port number pair, or a media access control (MAC) address. Source node 506 can also issue a new token with the data channel identifier. The new token can be tied to the data channel identifier. Receiving node 508 can obtain content 570 via the allocated data channel (operation 538). To do so, receiving node 508 can submit the token, which can be the original token or the new token, via the data channel to source node 506 for verification. Upon verification, source node 506 can initiate the transfer if source node 506 is ready to do so and has the capacity. It should be noted that the data channel can be the same network connection that facilitates the request channel.

Here, receiving node 508 may submit tokens at least twice: once to request the channel and once on the data channel. To avoid generating a second token, source node 506 may construct the data channel identifier uniquely for receiving node 508 and include information in the first token that would only verify the data channel identifier. In other words, source node 506 can bind the first token to the data channel identifier during the generation process, but may not provide the data channel identifier to receiving node 508 until the token is submitted.

In some embodiments, source nodes 500 can offer tokens with a priority level, such as bronze, silver, and gold level services. For example, source node 506 would only offer gold-level tokens if source node 506 can service that token. However, source node 506 may oversubscribe silver- or bronze-level tokens. The higher priority offers can create an artificial ceiling on scoreboard 507 for the number of accepted tokens on the data channel. For example, if source node 506 can service ten requests, source node 506 may offer three gold-level, five silver-level, and two bronze-level tokens. If source node 506 supports job preemption, source node 506 could significantly oversubscribe lower priority tokens with the allowance that a lower priority token could be preempted.

The request channel and the data channel may not be short-lived connections. Requesting node 508, for example, may stay connected to source node 506's request channel for a time up to a threshold amount of time. Likewise for the data channel, requesting node 508 may stay connected to source node 506's data channel up to a threshold amount of time, but can only submit a request at the rate allowed by the tokens. For reach request, source node 506 can present the token and the data channel identifier.

Figure 5B:
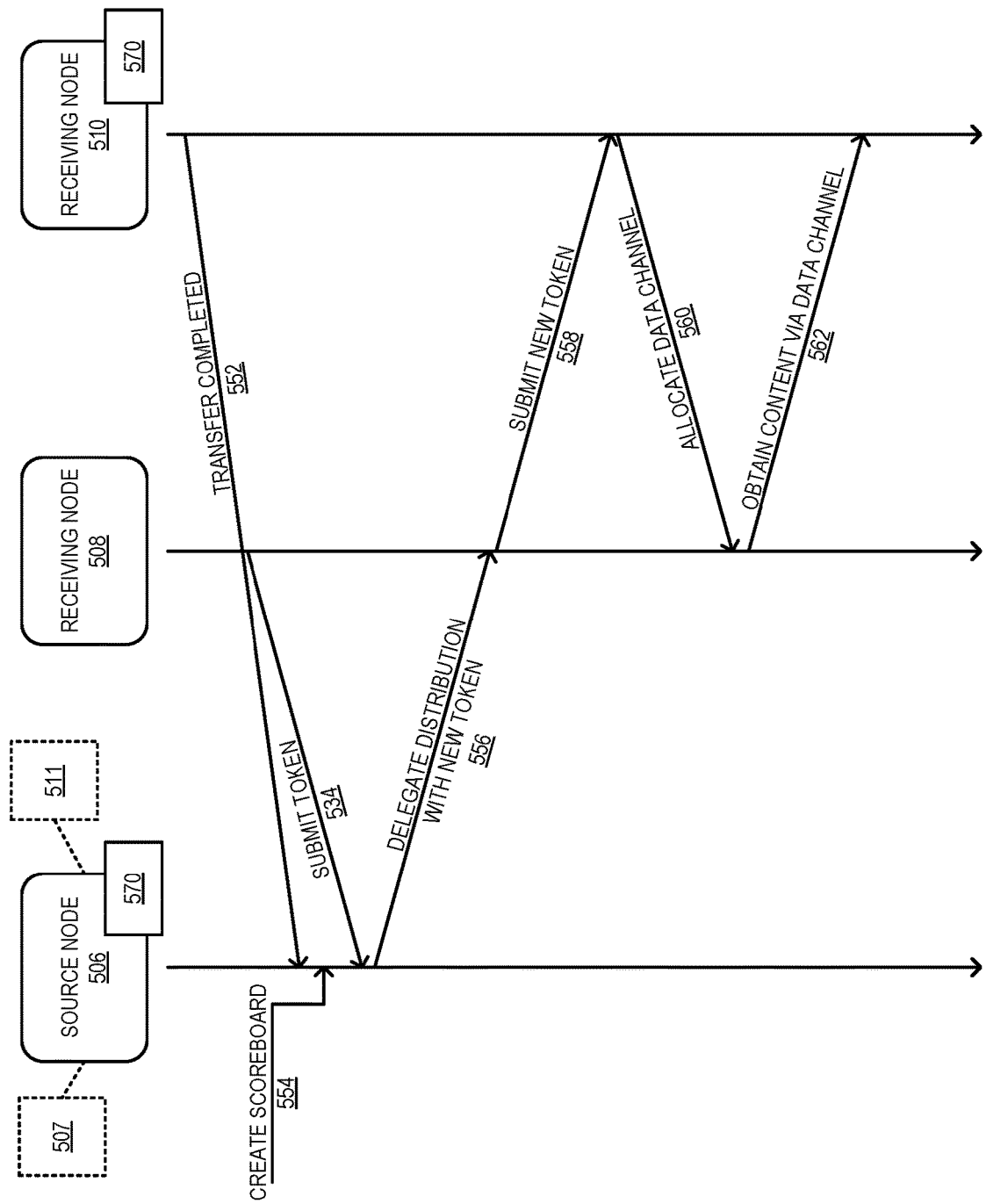
FIG. 5B illustrates an exemplary delegable content distribution in an enterprise environment, in accordance with an embodiment of the present application.

FIG. 5B illustrates an exemplary delegable content distribution in an enterprise environment, in accordance with an embodiment of the present application. Source node 506 can delegate the distribution of content 570 upon receiving a new request or when a token is submitted. For example, source node 506 can determine that receiving node 510 has obtained content 570 and receiving node 508 can obtain content 570 more efficiently from receiving node 510. In addition, source node 506 can use two mechanisms for the delegation. In a first way, source node 506 can offer receiving node 510 as another source node, and receiving node 508 requests content 570 from receiving node 510, considering it a source node.

In a second way, source node 506 can maintain a scoreboard for each receiving node that has already downloaded content 570. For example, source node 506 can maintain a scoreboard 511 for receiving node 510. Source node 506 can issue tokens and data channel identifiers that redirect receiving node 508 to receiving node 510's data channel. In that case, source node 506 and receiving node 508 can share a cryptographic key to authenticate the redirection. Source node 506 may use an existing protocol, such as OAuth 2.0, or source node 506 and receiving node 508 may agree on a key.

During operation, receiving node 510 can notify source node 506 regarding the completion of the transfer of content 570 (operation 552). This may cause source node 506 to create a scoreboard 511 for receiving node 510 (operation 554). When receiving node 508 submits the token (operation 534), source node 506 can notify receiving node 508 regarding the delegation of the distribution of content 570 to receiving node 510 with a new token (operation 556). Receiving node 508 can submit the new token to receiving device 510 (operation 558). Upon verification of the token, receiving device 510 can allocate its data channel to receiving device 508 (operation 560). Receiving node 508 can obtain content 570 via the allocated data channel from receiving node 510 (operation 562).

To facilitate these operations, source node 506 may run a time service such that all requests have the current producer time. Alternatively, receiving node 508 can request source node 506's time. This allows receiving node 508 to synchronize a token to source node 506's clock even if source node 506 and receiving node 508 do not have synchronized clocks. Receiving node 508 can use more a sophisticated clock synchronization mechanism, such as requesting source node 506's time at specific time intervals to determine the clock skew between oscillators. This allows these nodes to accurately derive a future time. These mechanisms use virtual times (or oscillators) for each source node and do not need to reset the actual operating system time or hardware clock. If a request is delegated to receiving node 510, receiving node 510 can keep a virtual clock corresponding to source node 506. This allows receiving node 510 to authorize tokens with source node 506's clock.

Deferral and Delegation Operations

Figure 6A:
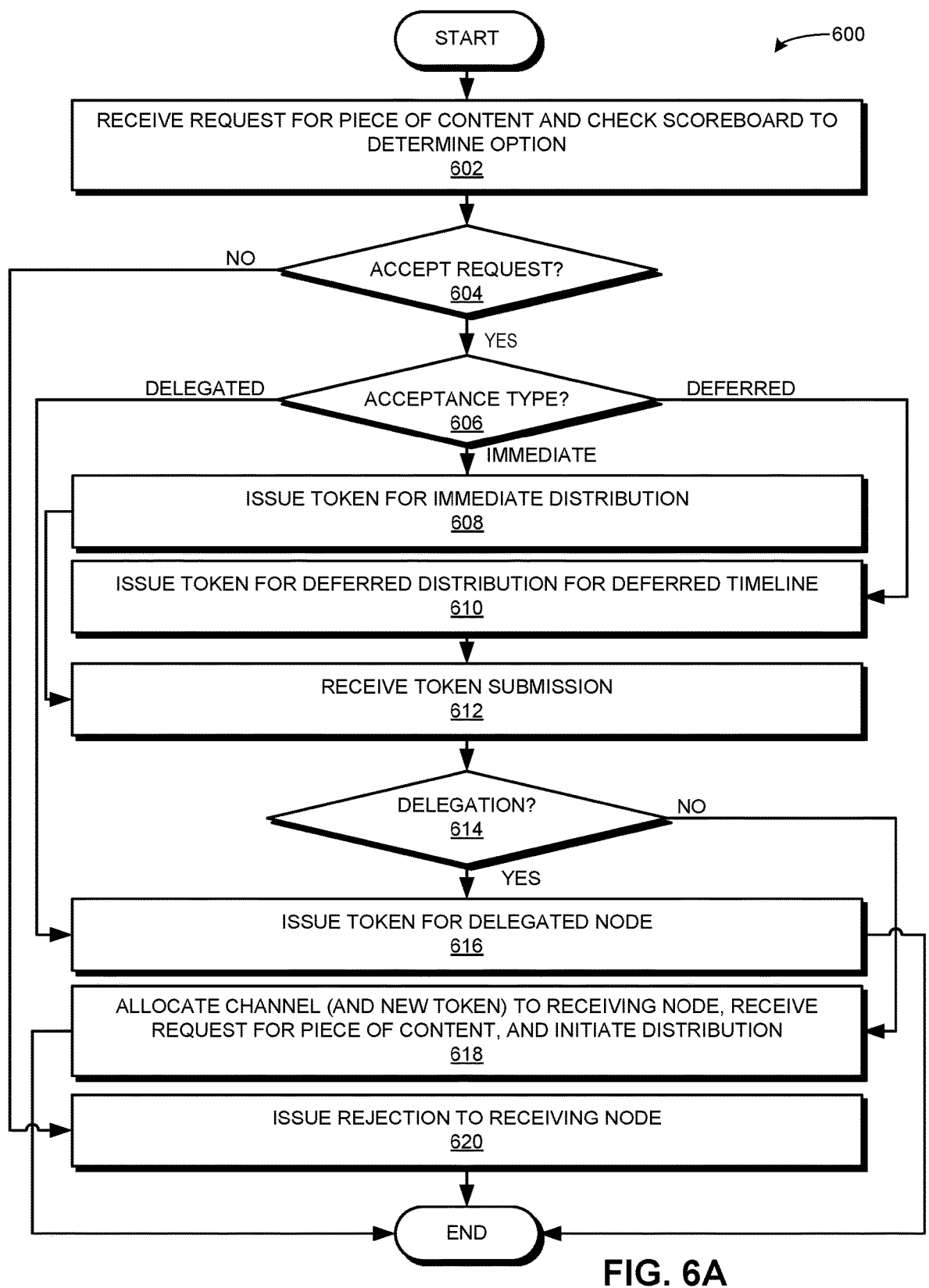
FIG. 6A presents a flowchart illustrating a method of a source node providing a piece of content to a receiving node, in accordance with an embodiment of the present application.

FIG. 6A presents a flowchart 600 illustrating a method of a source node providing a piece of content to a receiving node, in accordance with an embodiment of the present application. During operation, the source node receives a channel request for a piece of content and checks the scoreboard to determine an option (operation 602). The source node determines whether to accept the request (operation 604). If accepted, the source node determines the acceptance type (operation 606). If the acceptance is immediate, the source node can issue a token for an immediate distribution (operation 608). If the acceptance is deferred, the source node can issue a token for a deferred distribution for a deferred timeline (operation 610).

Upon issuing the token (operation 608 or 610), the source node can receive a token submission (operation 612). The source device can decide whether to delegate the request (operation 614). If the acceptance type is delegation (operation 606) or the source device has delegated the token submission (operation 614), the source node can issue a new token for the delegated node (operation 616). If the source device has not delegated the token submission (operation 614), the source node allocates a channel (and a new token) to the receiving node, receives a request for the piece of content (e.g., based on the new token), and initiates the distribution (operation 618). If the request is not accepted (operation 604), the source node issues a rejection to the receiving node (operation 620).

Figure 6B:
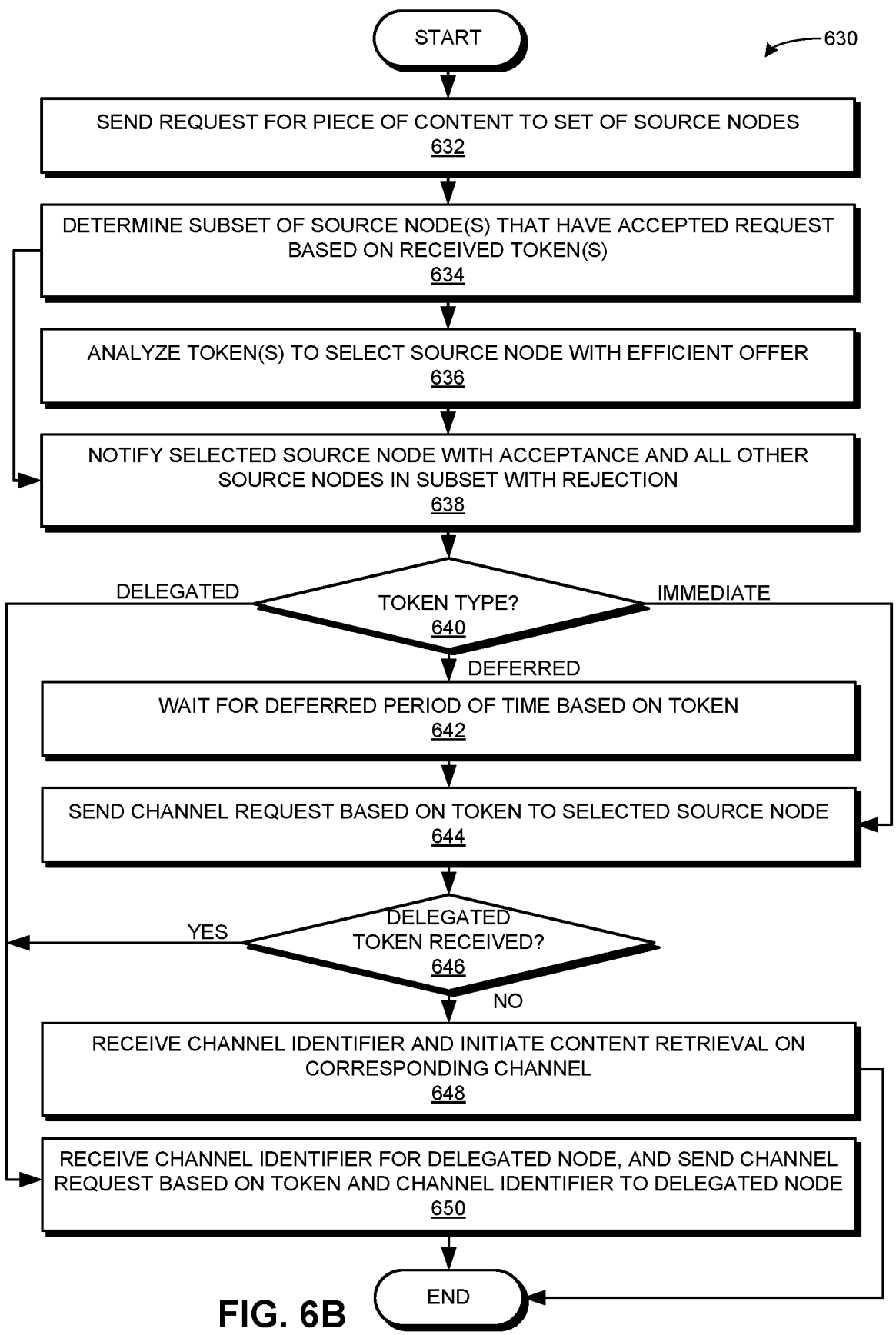
FIG. 6B presents a flowchart illustrating a method of a receiving node obtaining a piece of content from a source node, in accordance with an embodiment of the present application.

FIG. 6B presents a flowchart 630 illustrating a method of a receiving node obtaining a piece of content from a source node, in accordance with an embodiment of the present application. During operation, the receiving node sends a request for a piece of content to a set of source nodes (operation 632) and determines a subset of source node(s) that have accepted the request based on the received token(s) (operation 634). The receiving node analyzes the token(s) to select a source node with an efficient offer (operation 636), and notifies the selected source node with an acceptance and all other nodes in the subset with a rejection (operation 638). The receiving node then determines the type of the token (operation 640).

If the token type is deferred, the receiving node waits for a deferred period of time based on the token (operation 642). If the token type is immediate (operation 640) or upon waiting for the period of time (operation 642), the receiving node sends a channel request based on the token to the selected source node (operation 644) and checks whether it has received a new delegated token (operation 646). If not, the receiving node receives a channel identifier and initiates the content retrieval on the corresponding channel (operation 648). If the token type is delegated (operation 640) or the receiving node has received a new delegated token (operation 646), the receiving node receives a channel identifier of the delegated node, and sends a channel request based on the token and the channel identifier to the delegated node (operation 650).

Figure 6C:
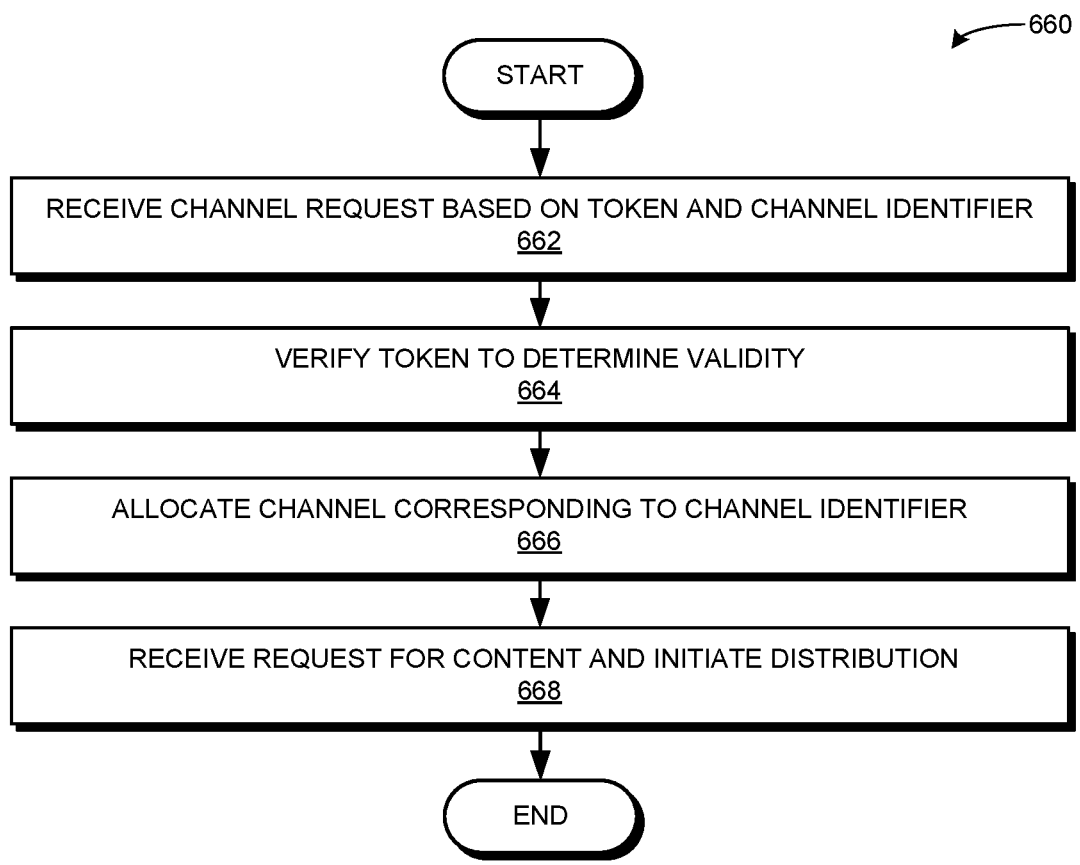
FIG. 6C presents a flowchart illustrating a method of a delegated node providing a piece of content to a receiving node, in accordance with an embodiment of the present application.

FIG. 6C presents a flowchart 660 illustrating a method of a delegated node providing a piece of content to a receiving node, in accordance with an embodiment of the present application. During operation, the delegated node, which can be another receiving node, receives a channel request based on a token and a channel identifier (operation 662), and verifies the token to determine validity (operation 664). The delegated node then allocates channel corresponding to the channel identifier (operation 666). The delegated node then receives a request for the piece of content and initiates the distribution (operation 668).

Exemplary Computer System and Apparatus

Figure 7:
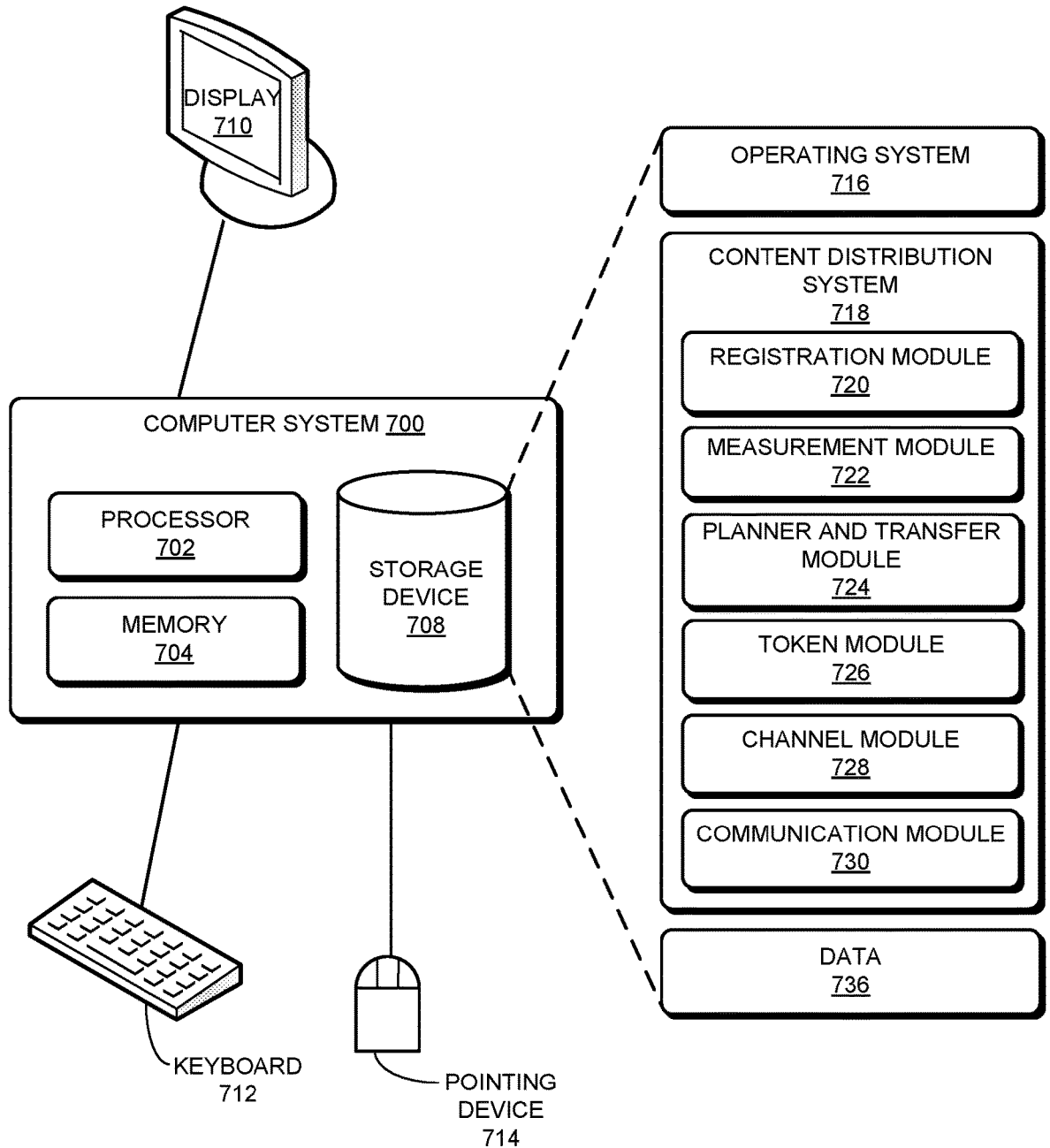
FIG. 7 illustrates an exemplary computer system that facilitates efficient content distribution in an enterprise environment, in accordance with an embodiment of the present application.

FIG. 7 illustrates an exemplary computer system that facilitates efficient content distribution in an enterprise environment, in accordance with an embodiment of the present application. Computer system 700 includes a processor 702, a memory device 704, and a storage device 708. Memory device 704 can include a volatile memory device (e.g., a dual in-line memory module (DIMM)). Furthermore, computer system 700 can be coupled to a display device 710, a keyboard 712, and a pointing device 714. Storage device 708 can store an operating system 716, a content distribution system 718, and data 736. Content distribution system 718 can facilitate the operations of one or more of: controller 140, source device 102, group heads 104, 106, 108, 144, and 146, source device 506, and receiving devices 508 and 510.

Content distribution system 718 can include instructions, which when executed by computer system 700 can cause computer system 700 to perform methods and/or processes described in this disclosure. Specifically, content distribution system 718 can include instructions for maintaining information of a current set of devices and subnets in the enterprise environment in a node database (registration module 720). Content distribution system 718 can also include instructions for discovering topographical information of the enterprise environment based on measurements (measurement module 722). Furthermore, content distribution system 718 can also include instructions for planning the distribution of a piece of content in the enterprise environment based on an inter-group distribution tree and an intra-group distribution tree (planner and transfer module 724).

Moreover, content distribution system 718 can also include instructions for distributing the piece of content via these trees (planner and transfer module 724). Content distribution system 718 can include instructions for generating an immediate, deferred, or delegated token for distributing a piece of content (token module 726). Content distribution system 718 can further include instructions for allocating a channel based on the token (channel module 728). Content distribution system 718 may further include instructions for sending and receiving messages (communication module 730). Data 736 can include any data that can facilitate the operations of content distribution system 718.

Figure 8:
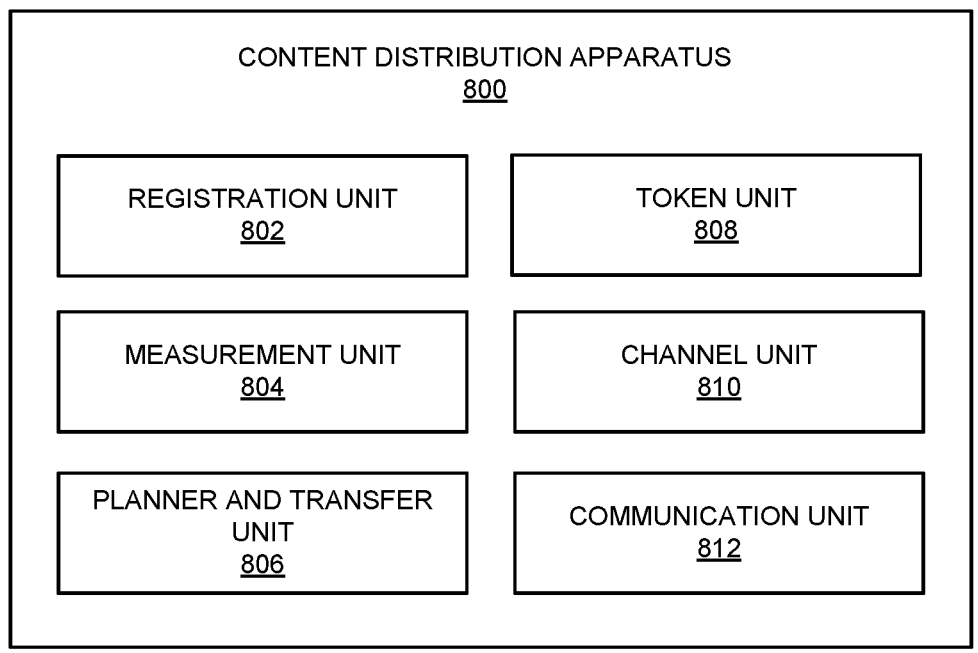
FIG. 8 illustrates an exemplary apparatus that facilitates efficient content distribution in an enterprise environment, in accordance with an embodiment of the present application.

FIG. 8 illustrates an exemplary apparatus that facilitates efficient content distribution in an enterprise environment, in accordance with an embodiment of the present application. Content distribution apparatus 800 can comprise a plurality of units or apparatuses which may communicate with one another via a wired, wireless, quantum light, or electrical communication channel. Apparatus 800 may be realized using one or more integrated circuits, and may include fewer or more units or apparatuses than those shown in FIG. 8. Further, apparatus 800 may be integrated in a computer system, or realized as a separate device that is capable of communicating with other computer systems and/or devices. Specifically, apparatus 800 can comprise units 802-812, which perform functions or operations similar to modules 720-730 of computer system 700 of FIG. 7, including: a registration unit 802; a measurement unit 804; a planner and transfer unit 806; a token unit 808; a channel unit 810; and a communication unit 812.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A method for facilitating dynamic content distribution in an enterprise environment, comprising:
   determining, by a controller of the enterprise environment, topographical information of the enterprise environment, wherein the topographical information includes information associated with a plurality devices managed by the controller;
   grouping the plurality of devices into a set of logical groups based on the topographical information, wherein a respective logical group includes a set of devices of the plurality of devices and a network that couples the set of devices in the logical group;
   generating a distribution plan for distributing a piece of content via a first distribution tree of the set of logical groups, wherein a respective node of the first distribution tree represents a logical group of the set of logical groups, and wherein a logical group hosting the piece of content is represented by a root node of the first distribution tree; and
   sending a notification message comprising the distribution plan to a respective logical group of the set of logical groups.

2. The method of claim 1, wherein the distribution plan further comprises a timeline indicating when a receiving device is allowed to request the piece of content.

3. The method of claim 1, wherein the piece of content is a firmware update for the plurality of devices managed by the controller.

4. The method of claim 1, further comprising selecting one or more group heads for a respective logical group of the set of logical groups, wherein inter-group connections between a first and a second logical groups are formed between the respective group heads of the first and second logical groups.

5. The method of claim 4, wherein the first logical group includes a first group head and a second group head, wherein the piece of content is divided into a set of unique blocks, and wherein the first group head is configured to obtain a first subset of the set of unique blocks from an upstream node of the first distribution tree and a second subset of the set of unique blocks from the second group head.

6. The method of claim 4, further comprising determining a second distribution tree within the first logical group, wherein the second distribution tree spans a respective receiving node of the piece of content, and wherein a group head of the first logical group is at a top level of the second distribution tree.

7. The method of claim 1, wherein determining the topographical information comprises determining, by using message queue (MQ)-based message exchanges, one or more of:
   device information of one or more devices of the enterprise environment; and
   bandwidth of a respective link in the network of the enterprise environment.

8. A non-transitory computer-readable storage medium storing instructions that when executed by a computer cause the computer to perform a method for facilitating dynamic content distribution in an enterprise environment, the method comprising:
   determining, by a controller of the enterprise environment, topographical information of the enterprise environment, wherein the topographical information includes information associated with a plurality devices managed by the controller;
   grouping the plurality of devices into a set of logical groups based on the topographical information, wherein a respective logical group includes a set of devices of the plurality of devices and a network that couples the set of devices in the logical group;
   generating a distribution plan for distributing a piece of content via a first distribution tree of the set of logical groups, wherein a respective node of the first distribution tree represents a logical group of the set of logical groups, and wherein a logical group hosting the piece of content is represented by a root node of the first distribution tree; and
   sending a notification message comprising the distribution plan to a respective logical group of the set of logical groups.

9. The computer-readable storage medium of claim 8, wherein the distribution plan further comprises a timeline indicating when a receiving device is allowed to request the piece of content.

10. The computer-readable storage medium of claim 8, wherein the piece of content is a firmware update for the plurality of devices managed by the controller.

11. The computer-readable storage medium of claim 8, wherein the method further comprises selecting one or more group heads for a respective logical group of the set of logical groups, wherein inter-group connections between a first and a second logical groups are formed between the respective group heads of the first and second logical groups.

12. The computer-readable storage medium of claim 11, wherein the first logical group includes a first group head and a second group head, wherein the piece of content is divided into a set of unique blocks, and wherein the first group head is configured to obtain a first subset of the set of unique blocks from an upstream node of the first distribution tree and a second subset of the set of unique blocks from the second group head.

13. The computer-readable storage medium of claim 11, wherein the method further comprises determining a second distribution tree within the first logical group, wherein the second distribution tree spans a respective receiving node of the piece of content, and wherein a group head of the first logical group is at a top level of the second distribution tree.

14. The computer-readable storage medium of claim 8, wherein determining the topographical information comprises determining, by using message queue (MQ)-based message exchanges, one or more of:
   device information of one or more devices of the enterprise environment; and
   bandwidth of a respective link in the network of the enterprise environment.

15. A computer system for facilitating a controller of the enterprise environment, the computer system comprising:
   a processor; and
   a storage device coupled to the processor and storing instructions which when executed by the processor cause the processor to perform a method, wherein the method comprises:
      determining topographical information of the enterprise environment, wherein the topographical information includes information associated with a plurality devices managed by the controller;
      grouping the plurality of devices into a set of logical groups based on the topographical information, wherein a respective logical group includes a set of devices of the plurality of devices and a network that couples the set of devices in the logical group;
      generating a distribution plan for distributing a piece of content via a first distribution tree of the set of logical groups, wherein a respective node of the first distribution tree represents a logical group of the set of logical groups, and wherein a logical group hosting the piece of content is represented by a root node of the first distribution tree; and
      sending a notification message comprising the distribution plan to a respective logical group of the set of logical groups.

16. The computer system of claim 15, wherein the distribution plan further comprises a timeline indicating when a receiving device is allowed to request the piece of content.

17. The computer system of claim 15, wherein the method further comprises selecting one or more group heads for a respective logical group of the set of logical groups, wherein inter-group connections between a first and a second logical groups are formed between the respective group heads of the first and second logical groups.

18. The computer system of claim 17, wherein the first logical group includes a first group head and a second group head, wherein the piece of content is divided into a set of unique blocks, and wherein the first group head is configured to obtain a first subset of the set of unique blocks from an upstream node of the first distribution tree and a second subset of the set of unique blocks from the second group head.

19. The computer system of claim 17, wherein the method further comprises determining a second distribution tree within the first logical group, wherein the second distribution tree spans a respective receiving node of the piece of content, and wherein a group head of the first logical group is at a top level of the second distribution tree.

20. The computer system of claim 15, wherein determining the topographical information comprises determining, by using message queue (MQ)-based message exchanges, one or more of:
   device information of one or more devices of the enterprise environment; and
   bandwidth of a respective link in the network of the enterprise environment.

* * * * *